(12) United States Patent
Tanaka et al.

(10) Patent No.: US 8,512,828 B2
(45) Date of Patent: Aug. 20, 2013

(54) BIAXIALLY ORIENTED WHITE POLYPROPYLENE FILM, REFLECTION PLATE AND RECEIVING SHEET FOR THERMAL TRANSFER RECORDING

(75) Inventors: Shigeru Tanaka, Otsu (JP); Junichi Masuda, Otsu (JP); Masatoshi Ohkura, Otsu (JP); Tatsuya Itou, Otsu (JP)

(73) Assignee: Toray Industries, Inc., Tokyo (JP)

( * ) Notice: Subject to any disclaimer, the term of this patent is extended or adjusted under 35 U.S.C. 154(b) by 660 days.

(21) Appl. No.: 12/301,018

(22) PCT Filed: May 15, 2007

(86) PCT No.: PCT/JP2007/059909
§ 371 (c)(1),
(2), (4) Date: Nov. 14, 2008

(87) PCT Pub. No.: WO2007/132826
PCT Pub. Date: Nov. 22, 2007

(65) Prior Publication Data
US 2009/0208676 A1    Aug. 20, 2009

(30) Foreign Application Priority Data
May 16, 2006  (JP) ................... 2006-136143

(51) Int. Cl.
*B41M 5/40* (2006.01)
*B32B 5/16* (2006.01)
*B32B 3/26* (2006.01)

(52) U.S. Cl.
USPC ................... 428/32.5; 428/304.4; 428/329

(58) Field of Classification Search
USPC .................... 428/32.5, 304.4, 329
See application file for complete search history.

(56) References Cited

U.S. PATENT DOCUMENTS
6,534,150 B1    3/2003    Yamanaka et al.
2005/0191464 A1    9/2005    Takahashi et al.

FOREIGN PATENT DOCUMENTS
EP    0 435 626 A2    7/1991
EP    0 492 942 A2    7/1992
EP    0 724 181 A2    7/1996
EP    1 097 805 A1    5/2001
EP    1 542 042 A    6/2005
(Continued)

OTHER PUBLICATIONS

Partial English translation of JP-11-348136-A, dated Dec. 21, 1999.
(Continued)

*Primary Examiner* — Gerard Higgins
*Assistant Examiner* — Sathavaram I Reddy
(74) *Attorney, Agent, or Firm* — Birch, Stewart, Kolasch & Birch, LLP

(57) ABSTRACT

A biaxially oriented white polypropylene film containing a core layer (layer A) and a skin layer (layer B), said layer B is laminated at least on one surface of said layer A, wherein said layer A contains a polypropylene resin having β-crystal activity and 1 to 20 mass % particle (a) having an average dispersed diameter of 60 to 400 nm, and wherein, said layer B contains a polypropylene resin and 0.05 to 5 mass % particle (b) of an average dispersed diameter of 1 to 4 μm. The present invention provides a biaxially oriented white polypropylene film excellent in film quality and productivity and capable of making sensitivity and productivity compatible in a high level when used as a base for a receiving sheet, and a receiving sheet for thermal transfer recording made thereof.

10 Claims, 2 Drawing Sheets

(56) References Cited

FOREIGN PATENT DOCUMENTS

| | | |
|---|---|---|
| EP | 1 702 761 A1 | 9/2006 |
| EP | 1 757 653 A1 | 2/2007 |
| JP | 4-309546 A | 11/1992 |
| JP | 5-78512 A | 3/1993 |
| JP | 7-232397 A | 9/1995 |
| JP | 8-262208 A | 10/1996 |
| JP | 11-348136 A | 12/1999 |
| JP | 2004-160689 A | 6/2004 |
| JP | 2004-160689 * | 10/2004 |
| JP | 2004-309804 A | 11/2004 |
| JP | 2006-095940 A | 4/2006 |
| JP | 2006-181915 A | 7/2006 |
| WO | WO-03/093004 A1 | 11/2003 |
| WO | WO-2005/103127 A1 | 11/2005 |

OTHER PUBLICATIONS

Partial English translation of JP-2004-160689-A, dated Jun. 10, 2004.

Partial English translation of JP-2004-309804-A, dated Nov. 4, 2004.

Partial English translation of JP-7-232397-A, dated Sep. 5, 1995.

* cited by examiner fusion temperature

BIAXIALLY ORIENTED WHITE POLYPROPYLENE FILM, REFLECTION PLATE AND RECEIVING SHEET FOR THERMAL TRANSFER RECORDING

TECHNICAL FIELD

The present invention relates to a biaxially oriented white polypropylene film. Furthermore, it relates to a reflection plate or a receiving sheet for thermal transfer recording made thereof.

BACKGROUND TECHNOLOGY

White films are, compared to papers made of pulp, as synthetic papers more excellent in water resistance, strength, smoothness, etc., used as general packaging materials, display items such as labels, posters, stickers, thermal transfer recording receiving sheets for thermal transfer recording system, reflectors or reflection plates or the like.

Among them, the thermal transfer recording system is a printing system in which an ink ribbon having an ink layer which is a dye containing layer and a receiving sheet are superposed and by heating from the ink ribbon side with a thermal head, the color material or the color material component is melted or sublimated to be transferred and printed in fine dots (half-tone) onto the receiving sheet.

In recent years, when the receiving sheet for thermal transfer recording is printed, heat load received by the receiving sheet becomes high due to increasing printing speed. And, since process conditions have become severe and due to down-sizing of printing machines, the environment in which the receiving sheet for thermal transfer recording is used is becoming severe year by year. As a background of such environmental change, for a white film used as base for the receiving sheet for thermal transfer recording, it is strongly desired, while satisfying whiteness and cushion factor, to improve processing properties such as crease resistance and emboss resistance, and that sensitivity, emboss depth of high concentration region of the printed receiving sheet is small and to be low in cost.

Conventionally, as a base of receiving sheet used for such thermal transfer recording system, various kinds of white polypropylene films have been proposed such as a white film in which an inorganic particle or an immiscible resin such as polyester resin is incorporated in the polypropylene, and the interface between the polypropylene and the inorganic particle or the immiscible resin is peeled off in a drawing process to form voids (i.e., refer to Patent references 1 and 2). However, in the white film in which these proposed void-forming agents, composed of the immiscible resin or inorganic particle, are added, it becomes necessary to add a much amount of the void-forming agent. Accordingly, there are cases in which many protrusions caused by the particles are formed on the film surface to enhance surface roughness, or in the film forming process and in the successive processing steps, the particles fall off to stain the process. Furthermore, there is a case in which, due to a large average dispersed diameter of the immiscible resin or inorganic particle in the film, formed voids become coarse and few, and cushion factor is low and crease resistance and emboss resistance are inferior. And, a receiving sheet for thermal transfer recording in which the white film is used as its base becomes a sheet of a low sensitivity. And, when it is used as a reflection plate, its light reflectance becomes low. In addition, there was a problem that the cost of the obtained film becomes high when, in order to densify voids, particle diameter of the immiscible resin or inorganic particle is made small and/or the particle size distribution is made narrow.

On the other hand, as a method for making voids in the polypropylene film other than the above-mentioned, for example, a method in which, when an undrawn sheet is produced by melt-extruding a polypropylene, β-form crystal (crystal density: 0.922 g/cm$^3$) of which crystal density is low is formed in the undrawn sheet, and by drawing it, the crystal is converted into α-form crystal (crystal density: 0.936 g/cm$^3$) of which crystal density is high to form voids by the difference of crystal density between them, can be mentioned.

Regarding this method, a microporous film obtained by adding β crystal nucleating agent and calcium carbonate to an ethylene-propylene block copolymer and an ethylene containing polypropylene (i.e., refer to Patent reference 3) or, a white film in which a skin layer having heat sealability or printability is laminated on at least one surface of a core layer composed of an orientation acceleration polymer, homopolypropylene, β crystal nucleating agent and an inorganic particle (i.e., refer to Patent reference 4), in addition, a microporous polypropylene film having β-crystal activity and its porosity is increased by an biaxial drawing (i.e., refer to Patent reference 5), or the like are proposed. However, in these proposals, since it is difficult to form receiving layer uniformly, there were problems that sensitivity is low or, surface glossiness is low. Furthermore, there was a problem that emboss depth in the receiving sheet is large when printed.

On the other hand, as other uses of the white film, a reflector or a reflection plate can be mentioned. For example, for a flat type liquid crystal display used for a note type personal computer in which flatness and small size are desired, a side light type, i.e., a backlight which illuminates image surface from a side is applied. The reflector or reflection plate used as a backlight for such liquid crystal image surface, as well as being a thin film, a high reflectance is required, and conventionally, films to which white pigment was added or, films to which inorganic particle or the like was added to include micro voids in their inside have been used. For example, as the light reflector made of polyolefin resin sheet, a light reflector containing polyolefin resin 100 mass parts and fine powdery inorganic-based filler 100 to 300 mass parts and drawn 1.5 to 20 times in areal ratio, and further, of which light reflectance at wavelength of 550 nm is 95% or more, rigidity of said reflector is at least 50 mm, is proposed (i.e., refer to Patent reference 6). However, in thus proposed films, there was a case in which the specific gravity was high and the processability was inferior, and the reflectance was decreased by a diffused reflection or absorption of light due to the resin and the inorganic particle for void formation, and a problem that the resin and the inorganic particle for void formation turned yellow by irradiation such as ultra-violet light, to thereby decrease whiteness of the film. Furthermore, there were problems that the resin and the inorganic particle for void formation fall off and stain the process environment in the film formation process and the light reflection plate production process.

Patent reference 1 JP-H5-78512A
Patent reference 2 JP-2006-181915A
Patent reference 3 JP-H4-309546A
Patent reference 4 WO03/93004 pamphlet
Patent reference 5 WO05/103127 pamphlet
Patent reference 6 JP-H8-262208A

DISCLOSURE OF THE INVENTION

Problem to be Solved by the Invention

The purpose of the present invention is to solve the above-mentioned problems. That is, it is to provide a biaxially oriented white polypropylene film which is, compared to conventional white films, excellent in productivity, soft and of a low specific gravity, high in whiteness, and excellent in crease resistance and emboss resistance, film producibility and processability. And, in case where it is used as a base of receiving sheet for thermal transfer recording, it provides a high performance receiving sheet for thermal transfer recording which is, than conventional white films, higher in sensitivity and smaller in emboss depth, and in case where it is used for a reflection plate, it provides a light reflection plate which increases brightness of liquid crystal display by exhibiting a high light reflectance.

Means for Solving the Problem

The above-mentioned problem can be overcome by a biaxially oriented white polypropylene film containing a core layer (layer A) and a skin layer (layer B), wherein said layer B is laminated at least on one surface of said layer A, said layer A contains a polypropylene resin having β-crystal activity and 1 to 20 mass % particle (a) having an average dispersed diameter of 60 to 400 nm, and wherein, said layer B contains a polypropylene resin and 0.05 to 5 mass % particle (b) having an average dispersed diameter of 1 to 4 μm.

Furthermore, it is preferable that the particle (a) to be added to the core layer is at least one kind of particles selected from the group consisting of zinc oxide, aluminium oxide and titanium oxide.

Furthermore, it is preferable that a porosity of the film is 20% or more.

Furthermore, it is preferable that a number of voids, of which nucleus is the particle (a), present in 10 μm×10 μm cross-section of layer A is 5 voids or more.

Furthermore, it is preferable that a crystallization temperature of the layer B is 115° C. or higher.

Furthermore, the receiving sheet for thermal transfer recording of the present invention is a sheet in which a receiving layer is provided at least one surface of the above-mentioned biaxially oriented white polypropylene film.

It is preferable that an emboss depth after printing of the receiving sheet is 20 μm or less.

Furthermore, the light reflection plate of the present invention is a plate comprising the above-mentioned biaxially oriented white polypropylene film.

Effect of the Invention

By the present invention, as stated below, it is possible to provide a biaxially oriented white polypropylene film excellent in film characteristics and productivity, for example, having excellent characteristics as a base for a reflection plate or for a receiving sheet for thermal transfer recording, and the reflection plate or the receiving sheet for thermal transfer recording made thereof.

(1) In the biaxially oriented white polypropylene film of the present invention, it becomes possible to increase micro voids without forming coarse voids by containing fine particles of an average dispersed diameter in the range of 60 to 400 nm in the core layer, and further, by having β-crystal activity, and it is possible to efficiently obtain a biaxially oriented white polypropylene film of which porosity is high.

(2) The biaxially oriented white polypropylene film of the present invention is, since it contains the particle of the dispersed diameter of specified range in the skin layer, excellent in productivity since it does not generate stickiness or surface defect even under a high temperature-high speed casting condition, high in surface glossiness, and further, good in slipperiness.

(3) The biaxially oriented white polypropylene film of the present invention is, since it has the skin layer, excellent in processability in the film formation process and the receiving sheet production process, since there is no trouble such as falling off of the fine particle of the core layer.

(4) The biaxially oriented white polypropylene film of the present invention is low in its specific gravity and excellent in whiteness, optical density, cushion factor, emboss resistance and crease resistance.

(5) The biaxially oriented white polypropylene film of the present invention is, since it has the skin layer at least one surface thereof, excellent in adhesion with an anchor agent layer of the receiving sheet for thermal transfer recording.

(6) The biaxially oriented white polypropylene film of the present invention is, due to the above-mentioned excellent characteristics, when processed to a receiving sheet for thermal transfer recording, high in sensitivity, small in emboss depth in high density printing portion, and an image is clearly printed like a silver halide print.

(7) The biaxially oriented white polypropylene film of the present invention is high in light reflectance, and when it is processed to a reflection plate, it exhibits a high light reflectance to increase brightness of liquid crystal display.

EXPLANATION OF CODES

Figure 1:
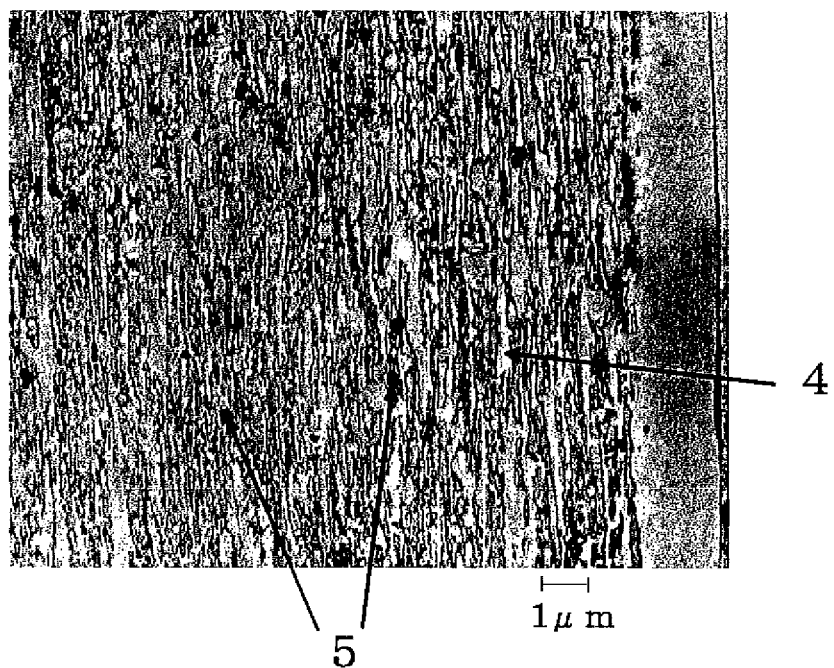
[FIG. 1] A photograph of cross-section of the biaxially oriented white polypropylene film of the present invention observed at a magnification of 10,000 times by a transmission electron microscope.
Figure 2:
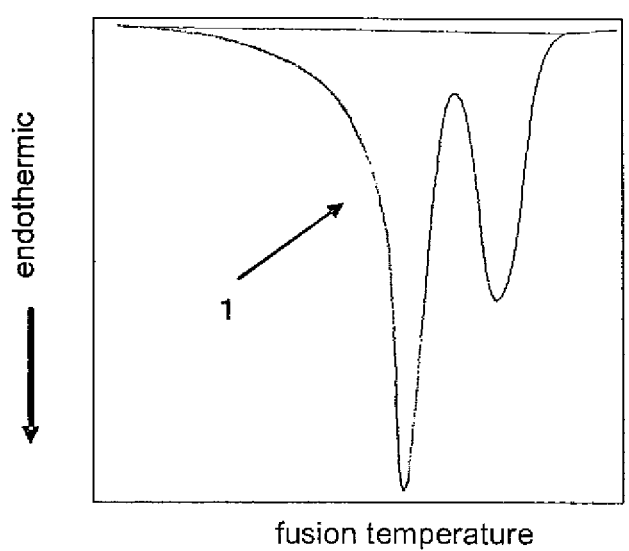
[FIG. 2] A schematic diagram of calorie curve obtained when β crystal ratio is determined by using a differential scanning calorimetry by the way of [Determination method and evaluation method of characteristics] (15).
Figure 3:
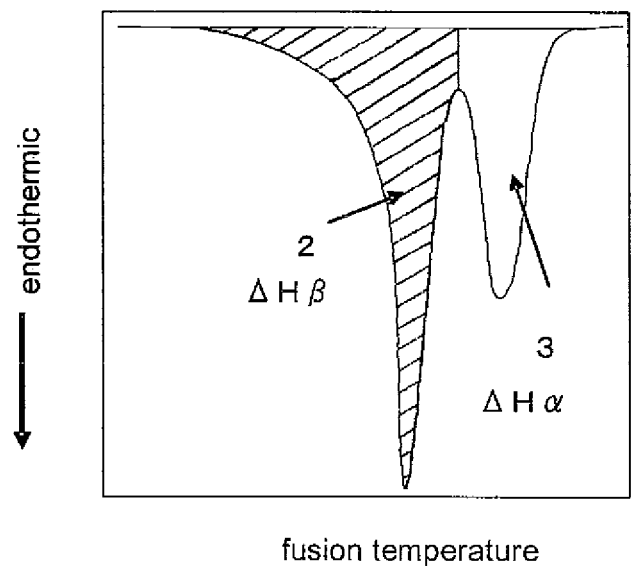
[FIG. 3] A schematic diagram of a method for calculating β crystal ratio by using the calorie curve of FIG. 2.

1 . . . Whole melting curve of β crystal containing PP and β crystal containing film
2 . . . Quantity of heat of fusion, $\Delta H\beta$, of β crystal portion
3 . . . Quantity of heat of fusion, $\Delta H\alpha$, of α α crystal portion
4 . . . Voids
5 . . . Nucleus of void
6 . . . Crater-like surface defect

BEST EMBODIMENTS FOR CARRYING OUT THE INVENTION

The core layer (layer A) of the biaxially oriented white polypropylene film of the present invention mainly comprises homopolymer resin of propylene but, it may be a polymer in which polypropylene and a monomer component of other unsaturated hydrocarbon are copolymerized, unless the purpose of the present invention is impaired. And, a polymer in which propylene and a monomer component other than propylene are copolymerized may be blended or, a polymer or a copolymer of an unsaturated hydrocarbon monomer component other than propylene may be blended. As the monomer components constituting these copolymer component or blended material, for example, ethylene, propylene (in case of a blended material copolymerized), 1-butene, 1-pentene, 3-methyl pentene-1,3-methyl butene1, 1-hexene, 4-methyl pentene-1,5-ethyl hexene-1,1-octene, 1-decene, 1-dodecene, vinyl cyclohexene, styrene, allyl benzene, cyclopentene, norbornene, 5-methyl-2-norbornene, acrylic acid and derivatives thereof are mentioned but, not limited thereto.

Regarding the polypropylene resin constituting the core layer (layer A), in view of improving film producibility, it is preferable to contain a so-called high melt strength polypropylene. By containing the high melt strength polypropylene in the polypropylene resin constituting layerA, breakages at drawing are few and film producibility is excellent. And, even when it is drawn at a low temperature and at a high ratio in longitudinal direction of film, there is no film breakage at a drawing in transverse direction and a stable film production is possible.

As methods to obtain the high melt strength polypropylene, for example, a method of blending a polypropylene containing much amount of high molecular weight component, a method of blending an oligomer or a polymer having branched structure, as described in JP-S62-121704A, a method of introducing a long chain branched structure in polypropylene molecule, or as described in JP-H6-157666A, a method, without introducing the long chain branch, of using a linear crystalline polypropylene of which melt strength and intrinsic viscosity, crystallization temperature and melting temperature respectively satisfy a specific relation, and further, of which residual ratio of boiling xylene extraction is in a specified range, etc., are preferably utilized. Among them, as the layer A, since stabilizing effect of melt-extrusion and improvement of productivity are significant, it is especially preferable to use a polypropylene having a long chain branch in its main skeleton. Whereas, the polypropylene having a long chain branch in its main chain skeleton is a polypropylene having a polypropylene chain branched from the polypropylene main chain skeleton and having a length similar to the main chain.

As concrete examples of the above-mentioned polypropylene having a long chain branch in its main skeleton, polypropylenes produced by Basell (Type name: PF-814, PF-633, PF-611, SD-632, etc.), polypropylenes produced by Borealis AG (Type name: WB130HMS, etc.), polypropylenes produced by Dow (Type name: D114, D201, D206, etc.) or the like are mentioned.

Regarding amount of the high melt strength polypropylene to be added, although it depends on properties of the high melt strength polypropylene, it is preferable to be 1 to 10 mass % with respect to the total amount of layer A. When the amount of high melt strength polypropylene added is less than 1 mass %, the effect of the improvement of film producibility may not be obtained. When the amount of high melt strength polypropylene added exceeds 10 mass %, the effect may saturate even when it is added more. The amount of the high melt strength polypropylene to be added is, more preferably, 1 to 5 mass %.

Furthermore, especially, in case where a high ratio drawing is carried out in film longitudinal direction, it is preferable to add the high melt strength polypropylene not only to the core layer (layer A) but also to the skin layer (layer B and layer C). By this way, in the film formation process, the skin layer is drawn along with the core layer and the entire film can be drawn more stably.

It is preferable that an isotactic index of the polypropylene resin constituting the core layer (layer A) is 90 to 99.5%. When the isotactic index is less than 90%, there may be cases in which film strength decreases or, crease resistance and emboss resistance deteriorate. And, when the isotactic index exceeds 99.5%, film formation may become unstable. More preferably, the isotactic index of the polypropylene of the layer A is 92 to 99%.

It is preferable that a melt flow rate (MFR) of the polypropylene resin of the core layer (layer A) is 1 to 30 g/10 min. When the MFR is less than 1 g/10 min, amount of extrudate may change when extruded at a low temperature of 250° C. or lower. And, when the MFR exceeds 30 g/10 min, and in case where the layer A and the skin layer (layer B and layer C) are coextruded, it may become difficult to laminate in uniform thicknesses. Furthermore, in casting process, when an undrawn sheet is obtained by solidifying the molten polymer extruded from a die on a metal drum, since contact point of the molten polymer on the metal drum greatly changes, it may become difficult to generate β crystal uniformly in the undrawn sheet, or thickness unevenness of the obtained white polypropylene film may increase, or voids may become not uniform The MFR of polypropylene of the layer A is, more preferably, 3 to 20 g/10 min.

The isotactic index and MFR of the polypropylene may be determined for raw material before film formation but, in case where an additive such as β crystal nucleating agent described below is contained, it is preferable to determine after adding the additive. Whereas, in case where characteristics of the polypropylene which does not contain an additive are to be determined after adding the additive, it may be used as a sample after removing the additive and impurity by extracting with n-heptane of a temperature of 60° C. or lower for 2 hours and vacuum drying at 130° C. for 2 hours or more.

Furthermore, since it decrease stress at drawing and it may accelerate void formation accompanied by the drawing, a polymer other than the polypropylene may be added to the core layer (layer A). As the polymer other than the polypropylene, a vinyl polymer resin including various kinds of polyolefin resin, a polyester resin, a polyamide resin, a polyphenylene sulfide resin and a polyimide resin, or the like are mentioned, and not especially limited thereto. Among them, by adding a so-called polyolefin elastomer resin, effects of decrease of drawing stress and acceleration of void formation of the white polypropylene film can be obtained at the same time.

As the polyolefin elastomer resin, although it is not especially limited, for example, a very low density polyethylene by metallocene catalyst method or linear low density polyethylene, ethylene.butene rubber, ethylene.propylene rubber, propylene.butene rubber, ethylene vinyl acetate, ethylene.methacrylate copolymer, ethylene.methyl methacrylate copolymer, ethylene.propylene.diene copolymer, isoprene rubber, styrene.butadiene rubber, hydrated styrene.butadiene rubber, styrene.butylene.styrene copolymer, styrene.ethylene.butylene.styrene copolymer or the like can be mentioned.

Among these polyolefin elastomer resins, as a resin to be added to the core layer (layer A), since it finely disperses in polypropylene in melt-extrusion process to improve film producibility in the successive drawing process, and further, accelerates void formation, the very low density polyethylene is especially preferable. As concrete examples of the very low density polyethylene, "Engage (trademark)" produced by Dow Chemical Company (Type name: 8411, 8452, 8100, etc.) or the like can be mentioned.

Regarding an adding amount of these other polymer, it is not especially limited unless other film characteristics are impaired, but it is preferable to be added 1 to 15 mass % with respect to the total amount of layer A. When the amount added is less than 1 mass %, the effect of addition may not be exhibited. And, when the amount added exceeds 15 mass %, the other polymer may not disperse well and it may impair the characteristics. The adding amount is more preferably, 2 to 10 mass %, still more preferably, 2 to 7 mass %.

It is necessary that the core layer (layer A) has β-crystal activity. Here, what the film has β-crystal activity means that, when the polypropylene is crystallized, β-form crystal, so-called β crystal which is one kind of crystal morphologies of polypropylene can be produced. Since the layer A has β-crystal activity, β crystal is produced in the film before drawing, and the β crystal is transformed to α-form crystal, so-called α crystal in successive drawing process, and it becomes possible to form uniform and dense voids in the film by making advantage of the difference of crystal densities.

In the present invention, it is decided if the layer A has β-crystal activity by measuring the entire white polypropylene film and according to the following criteria. That is, by using a differential scanning calorimeter, 5 mg film is heated at a rate of 20° C./min from room temperature to 260° C. under nitrogen atmosphere, maintained for 5 minutes at that temperature, then cooled to 30° C. at a cooling rate of 20° C./min, and after maintaining at 30° C. for 5 minutes, heated up to 280° C. at a rate of 20° C./min again. In the obtained calorie curve, when an endothermic peak accompanied with β crystal fusion is present in 140 to 160° C., and when a quantity of heat of fusion calculated from the peak area of said endothermic peak is 10 J/g or more, it is defined that the layer A of the white polypropylene film has β-crystal activity.

Furthermore, in case where an endothermic peak is present in the above-mentioned temperature range but it is not clear whether the peak is based on the fusion of β crystal, the film is measured by a wide angle X-ray diffraction method according to the method described in the item of determining method and evaluation method of the characteristics described below, and it may be confirmed by the presence of diffraction peak of β crystal (300) plane observed around 2θ=16°, and K value. That is, by being K value defined by the equation described below 0.3 or more, from the diffraction peak intensity of β crystal (300) plane (referred to as $I\beta_1$) observed around 2θ=16° and the diffraction peak intensity of α crystal of (110), (040) and (130) plane (referred to as $I\alpha_1$, $I\alpha_2$ and $I\alpha_3$, respectively) observed around 2θ=14, 17 and 19°, respectively, it can be decided that the film has β-crystal activity. Here, K value is an empirical value which indicates β crystal ratio.

$$K=I\beta_1/\{I\beta_1+(I\alpha_1+I\alpha_2+I\alpha_3)\}$$

It is preferable that the β crystal ratio of white polypropylene film of the present invention is 30 to 100%. When the β crystal ratio is less than 30%, the amount of void formation becomes insufficient and the voids may not distribute uniformly along the thickness direction of the film. And, as the β crystal ratio becomes high, the void formation can be accelerated more to show an excellent sensitivity when the polypropylene film is processed into a receiving sheet for thermal transfer recording, but when it is too high, crease resistance and emboss resistance of the polypropylene film may deteriorate. Accordingly, it is preferable that the β crystal ratio is, more preferably 40 to 95%, still more preferably 50 to 90%.

The β crystal ratio in the present invention is the value obtained by the equation below from the quantity of heat of fusion (ΔHβ) calculated from endothermic peak area based on fusion of β crystal of polypropylene, observed at 140 to 160° C. in the calorie curve of the second heating in the measurement of the above-mentioned differential scanning calorimeter, and the quantity of heat of fusion (ΔHα) calculated from endothermic peak area based on fusion of crystals other than β crystal of the polypropylene, observed at 160° C. or higher.

βcrystal ratio (%)={ΔHβ/(ΔHα+ΔHβ)}×100

In order to impart a high β-crystal activity such as a β crystal ratio of 30 to 100%, it is preferable to add a so-called β crystal nucleating agent to the polypropylene constituting the core layer (layer A). In case where the β crystal nucleating agent is not added, a high β crystal ratio such as the above-mentioned may not be obtained. As preferable β crystal nucleating agents, for example, iron oxide which forms a nanometer size dispersion, alkali or alkali earth metal salts of carboxylic acids represented by potassium 1,2-hydroxystearate, magnesium benzoate, magnesium succinate, magnesium phthalate or the like, amide-based compounds represented by N,N'-dicyclohexyl-2,6-naphthalene dicarboxyamide or the like, aromatic sulfonic acid compounds represented by sodium benzene sulfonate, sodium naphthalene sulfonate or the like, di- or triesters of di- or tribasic carboxylic acids, tetraoxaspiro compounds, imide carboxylic acid derivatives, phthalocyanine-based pigments represented by phthalocyanine blue or the like, quinacridone-based pigments represented by quinacridone, quinacridone quinine or the like, two components compounds consisting of component A which is an organic dibasic acid and component B which is an oxide, hydroxide or base of a metal of the Group 2 of the Periodic Table, can be mentioned, but not limited thereto. And, as the β crystal nucleating agent, one kind alone may be used, or two kinds or more may be used in combination.

As the β crystal nucleating agent to be added to the polypropylene constituting the core layer (layer A), among the above-mentioned, the following compounds 1 and 2 are especially preferable since it is possible to increase β crystal ratio of undrawn sheet, and it is possible to accelerate void formation in the successive drawing process.

[Compound 1]

Amide-based compound expressed by the following chemical formulas (1) and (2) represented by N,N'-dicyclohexyl-2,6-naphthalene dicarboxyamide or the like.

$$R_2-NHCO-R_1-CONH-R_3 \quad (1)$$

Here, $R_1$ in the formula denotes a saturated or unsaturated aliphatic residue having 1 to 24 carbons, a saturated or unsaturated alicyclic residue having 4 to 28 carbons or an aromatic residue having 6 to 28 carbons, $R_2$ and $R_3$ denote same or different cycloalkyl group residues having 3 to 18 carbons, cycloalkenyl group residues having 3 to 12 carbons or derivative residues thereof.

$$R_5-CONH-R_4-NHCO-R_6 \quad (2)$$

Here, $R_4$ in the formula denotes a saturated or unsaturated aliphatic residue having 1 to 24 carbons, a saturated or unsaturated alicyclic residue having 4 to 28 carbons or an heterocyclic residue having 6 to 12 carbons, or an aromatic residue having 6 to 28 carbons, $R_5$ and $R_6$ denote same or different cycloalkyl group residues having 3 to 12 carbons, cycloalkenyl group residues having 3 to 12 carbons or derivative residues thereof.

[Compound 2]

Two components compound consisting of component A which is an organic dibasic acid and component B which is an oxide, hydroxide or base of a metal of the Group 2 of the Periodic Table.

As concrete examples of such especially preferable β crystal nucleating agent or β crystal nucleating agent added polypropylene, a β crystal nucleating agent produced by New Japan Chemical Co., ltd. "NJSTAR (trademark)" (type name: NU-100, etc.), a β crystal nucleating agent added polypropylene "BEPOL (trademark)" (type name: B022-SP, etc.) produced by Sunoco Co., etc. are mentioned.

The amount of the β crystal nucleating agent contained is, although it depends on β crystal formation capacity of the β crystal nucleating agent used, it is preferable to be 0.01 to 0.5 mass % with respect to the total amount of layer A. When the amount of β crystal nucleating agent contained is less than 0.01 mass %, β crystal ratio of the obtained white polypropylene film is too low, and there may be cases in which specific gravity is high or crease resistance and emboss resistance are inferior. And, there may be a case in which sensitivity is inferior when processed into a receiving sheet for thermal transfer recording. When the amount of β crystal nucleating agent added exceeds 0.5 mass %, there may be cases in which β crystal ratio of the obtained polypropylene film saturates even when added more or dispersibility of the nucleating agent itself worsens to decrease the β crystal ratio on the contrary. The amount of β crystal nucleating agent contained is, more preferably 0.02 to 0.3 mass %, still more preferably 0.05 to 0.2 mass %.

It is necessary that particle (a) of an average dispersed diameter of 60 to 400 nm is contained in the core layer (layer A).

In the white polypropylene film of the present invention, by using the β crystal nucleating agent and the particle (a) of which average dispersed diameter is in the range of 60 to 400 nm in combination, compared to the conventional case in which an immiscible resin, inorganic particle or organic particle was used as a void-forming agent, nonuniform and coarse voids caused by dispersing conditions of the void-forming agent (dispersion size, presence or absence of an aggregation, etc.) are few, and uniform and dense voids can be formed. As the result, since coarse voids are few, although it is a film of low specific gravity, it is excellent in crease resistance and emboss resistance. In addition, it is possible to prevent troubles beforehand that the void-forming agent falls off from the film in the film formation process or the processing step to thereby stain the processes, or the film to be broken. And, compared to the white polypropylene film obtained by adding the β crystal nucleating agent alone, because it becomes possible to form many uniform and dense voids in wide drawing temperature range, it becomes possible to increase film formation speed and productivity increases to thereby make it possible to produce the white polypropylene film in a low cost.

In addition, by having many and uniform micro voids, cushion factor of the entire film becomes high, and emboss resistance is also improved. Furthermore, among the L, a, b values in the color tone of the film, especially the b value can be made lower (to a preferable bluish range).

From the above-mentioned, the receiving sheet for thermal transfer recording in which the white polypropylene film of the present invention is used as the base, compared to cases in which the white polypropylene film made by using conventional void-forming agent or the white polypropylene film made by using the β crystal nucleating agent alone is used as the base, can realize a higher sensitivity, crease resistance, emboss resistance and a higher productivity, at the same time.

It is necessary that the average dispersed diameter of the particle (a) is 60 to 400 nm. When the average dispersed diameter is less than 60 nm, it causes a poor dispersion in the polypropylene resin, i.e., particles aggregate, and coarse voids in the film may be formed. When the average dispersed diameter exceeds 400 nm, coarse voids are formed in the film and the porosity decreases, and the cushion factor, crease resistance and emboss resistance may decrease. The average dispersed diameter of particle (a) is, more preferably, 100 to 300 nm.

Here, the average dispersed diameter means the average particle diameter of particle in dispersed condition in the core layer (layer A). In order to determine the average dispersed diameter of such particle, according to the method indicated in item (1) in the section of determining method and evaluation method of characteristics described below, an ultra-thin section of cross-section of film is observed by a transmission electron microscope, and all of major diameters of particles contained per 10 μm×10 μm were measured and their average value was determined. This measurement was carried out for 10 positions while changing the position for observation, and their average value was taken as the average dispersed diameter of the particle.

In the biaxially oriented white polypropylene film of the present invention, it is preferable that the number of voids, per 10 μm×10 μm of the cross-section of layer A, is 10 voids or more. By being the number of voids, per 10 μm×10 μm of the cross-section of layer A, 10 voids or more, cushion factor of the entire film becomes high, emboss resistance and crease resistance are also improved, and further, color tone can be made more bluish. In the receiving sheet for thermal transfer recording in which such white polypropylene film is used as base, heat insulation from thermal head of printer becomes high, and a high sensitivity can be realized. It is preferable that the number of voids is 10 to 100 voids, more preferably, in the range of 15 to 50, since the above-mentioned characteristics and mechanical strength can be compatible.

Furthermore, in the white polypropylene film of the present invention, it is preferable that the number of voids of which nucleus is the particle (a) present in 10 μm×10 μm cross-section area of the layer A is 5 voids or more, since when printed as a receiving sheet for thermal transfer recording, emboss depth of high concentration region becomes small and emboss resistance is improved. That is, it is preferable that, among all voids, considerable number of voids are voids of which nucleuses are the particle (a). When number of voids of which nucleuses is the particle is less than 5 voids, improvement of emboss resistance may not be exhibited. It is more preferable that the number of voids of which nucleus is the particle (a) is 10 to 100 voids, and to be 15 to 50 voids is especially preferable. And, when the number of voids of which nucleus is the particle (a) exceeds 100 voids, creases may apt to be produced. Here, the cross-section of layer A is a cross-section of transverse direction-thickness direction and it is a surface to be observed of ultra-thin section made by a microtome.

Furthermore, in order to form voids of which nucleus is the particle (a) among considerable number of voids in the layer A, it is necessary that an amount contained of said particle is 1 to 20 mass %, preferably 2 to 15 mass %, more preferably in the range of 5 to 10 mass %. When the amount contained is less than 1 mass %, effect of the addition is low, and when it exceeds 20 mass %, there may be cases in which a stable melt-extrusion is difficult or co-extrusion ability with the surface layer is impaired to cause an uneven lamination. And, there may be a case in which the particle deposits on lip of die and a long time continuous film formation becomes difficult.

As a method for containing the particle (a) in the film, it is preferably utilized to, after adding and mixing the β crystal nucleating agent and the particle (a) to a polypropylene resin powder together with an antioxidant and a heat stabilizer of the polypropylene resin, feed to a twin screw type extruder to melt-mix. And, as other additives, it is preferable that a surface treating agent of the particle, a die stain preventing agent, a surface active agent, etc., is added in an amount which does not impair film characteristics, since it improves extrudability or raw material replaceability.

Furthermore, there are master batches such as "PEONY (trademark)" WHITE L-11165 MPT produced by Dainippon Ink and Chemicals in which 60 mass % rutile type titanium oxide of an average dispersed diameter in the range of 60 to 400 nm is added and mixed, or "PPM (trademark)" 20130 WHITE produced by Tokyo Printing Ink Mfg. Co. Ltd., etc., and such master batches can also be used by diluting with a polypropylene resin.

It is preferable that a primary average particle diameter of the particle (a) to be added and mixed to the polypropylene resin of the present invention is 400 nm or less, more preferably, the primary average particle diameter of the particle is in the range of 30 to 300 nm, since an average dispersed diameter in the layer A of the white polypropylene film becomes to the range of 60 to 400 nm. When the primary average particle diameter of the particle is less than 30 nm, it becomes more difficult to uniformly disperse in the polypropylene resin, and accordingly the particle aggregates in the resin, and the average dispersed diameter in the film may exceed 400 nm.

As the particle (a) to be added to the core layer (layer A), although not limited to as far as the average dispersed diameter is in the range of 60 to 400 nm, it is preferable to be at least one kind of particles selected from the group consisting of zinc oxide, aluminium oxide and titanium oxide, since dispersibility in the polypropylene resin is good. Among them, titanium oxide of which micro void producing effect is high by finely dispersing in the polypropylene having β-crystal activity, is especially preferable. As the titanium oxide, anatase type and rutile type can be mentioned, but rutile type is preferable in view of dispersibility in the polypropylene resin and heat stability.

In the white polypropylene film of the present invention, it is necessary to laminate layer B to at least one surface of the core layer (layer A) as a skin layer. And, it is necessary that the layer B contains a polypropylene resin and 0.05 to 0.5 mass % particle (b) of which average dispersed diameter is 1 to 4 µm. By laminating the skin layer (layer B), compared to a case in which the layer B is not laminated, smoothness of film surface and glossiness can be improved. Furthermore, when it is processed to a receiving sheet for thermal transfer recording by forming a receiving layer on the layer B, compared to a case in which the layer B is not laminated, close contactness with a thermal head is improved and a thermal diffusion is prevented, and sensitivity when transferred from an ink ribbon is improved.

It is preferable that the polypropylene resin constituting the skin layer (layer B) is, like the core layer (layer A), mainly consisted of propylene homopolymer, but in a range which does not impair the purpose of the present invention, it may be a polymer in which polypropylene and other monomer component of unsaturated hydrocarbon are copolymerized. And, a polymer in which propylene and a monomer component other than propylene are copolymerized may be blended, or a polymer or copolymer of a monomer component of an unsaturated hydrocarbon other than propylene may be blended. As the monomer component constituting such copolymerization component or blended material, the same component as the core layer (layer A) can be mentioned. Among them, a skin layer (layer B), in which 1 to 5 mass % ethylene is copolymerized with propylene, is preferable since co-drawability with the core layer (layer A) and adhesion with the receiving layer (or anchor layer) of the receiving sheet for thermal transfer recording can be made compatible.

It is preferable that an isotactic index of the polypropylene resin constituting the skin layer (layer B) is 95 to 99.8%. When the isotactic index is less than 95%, surface heat resistance of the film or a processed article thereof may be inferior. When the isotactic index exceeds 99.8%, a breakage may occur frequently in the film production process. The isotactic index of the polypropylene resin constituting the layer B is, more preferably, 96 to 99.5%.

Furthermore, it is preferable that a crystallization temperature of the skin layer (layer B) is 115° C. or higher. Here, crystallization temperature is a value measured for the entire layer B. If the crystallization temperature of the layer B is lower than 115° C., when casted at a high temperature exceeding 100° C. in a casting process, solidification may not complete to enable peeling off a sheet, and the undrawn sheet may stick to the casting drum. The crystallization temperature of the layer B is, more preferably 119° C. or higher. And, as the crystallization temperature of the layer B becomes high, sticking or defect becomes hard to occur even at a high temperature-high speed casting, and a film having a similar quality to that of a case in which drum temperature·peripheral speed are low may be produced. Although there is especially no upper limit for the crystallization temperature of the layer B, when it is too high, co-drawability with the layer A may be impaired. And, when it is processed to a receiving sheet for thermal transfer recording by providing a receiving layer on the layer B, since adhesion with the receiving layer may be impaired, it is preferable that the crystallization temperature of the layer B is 150° C. or lower. The crystallization temperature of the layer B can be controlled by crystallinity of polypropylene constituting the layer B, adding amount of the α crystal nucleating agent, the β crystal nucleating agent, the high melt strength polypropylene or the like, adding amount of the immiscible resins, inorganic particle, organic particle or the like. The crystallization temperature of the layer B is, more preferably, 120 to 145° C., and most preferably 123 to 130° C. Among them, it is especially preferable to add a high melt strength polypropylene to the layer B to raise crystallization temperature.

Here, it is preferable that the adding amount of the high melt strength polypropylene is, in view of stability of film production, 0.5 to 10 mass % with respect to the total amount of layer B. When the adding amount of the high melt strength polypropylene is less than 0.5 mass %, the effect of addition may not be obtained. And, when the adding amount exceeds 10 mass %, the effect of addition may saturate. The adding amount of the high melt strength polypropylene is, more preferably, 1 to 5 mass %. As the high melt strength polypropylene which can be preferably added to the layer B, the same one as the high melt strength polypropylene which can preferably added to the above-mentioned core layer (layer A) can be mentioned.

To the skin layer (layer B), α crystal nucleating agent may be added. As the α crystal nucleating agent, a sorbitol-based nucleating agent, an organic metal phosphate-based nucleating agent, an organic metal carboxylate-based nucleating agent, a rosin-based nucleating agent, etc., can be mentioned. Among them, the rosin-based nucleating agent is especially preferable since its crystallization acceleration effect is high. As the rosin-based nucleating agent, "Pinecrystal (trademark)" (type name: KM-1300, KM-1500, KM-1600, etc.) produced by Arakawa Chemical Industries, Ltd., or the like can be mentioned. It is preferable that the adding amount of the α crystal nucleating agent to the layer B is, 0.001 to 1 mass % with respect to the total amount of layer B. When the amount added of the crystal nucleating agent is less than 0.001 mass %, the effect of addition may not be obtained.

When the amount added of the crystal nucleating agent exceeds 1 mass %, not only the effect of addition may saturate, but also dispersibility of the nucleating agent itself may be impaired and surface defect may be generated. The adding amount of the α crystal nucleating agent is, more preferably, 0.01 to 0.8 mass %.

As the polypropylene resin of layer B, it is preferable that total amount of resin including polypropylene resin, various kinds of polypropylene copolymer and the high melt strength polypropylene is in the range of 99.95 to 95 mass % of the layer B, in view of co-extrudability and co-drawability with the layer A.

It is necessary that the average dispersed diameter of the particle (b) to be added to the skin layer (layer B) is 1 to 4 μm. When the average dispersed diameter is less than 1 μm, blocking prevention or slipperiness of the film are not good and a crease is easily produced on a winder at winding the film or on a slitter, and slipperiness with a metal roll is not good and the film may break. When the average dispersed diameter of the particle (b) exceeds 4 μm, in the film formation process or successive film processing step, particle may fall off to stain the process, in addition, when the white polypropylene films are superposed and rubbed, the film surface is easy to be damaged and the film may break. The average dispersed diameter of the immiscible resins, the inorganic particle and the organic particle is, more preferably, 1 to 3 μm. Whereas, the average dispersed diameter mentioned here can be determined in the same way as that of the above-mentioned average dispersed diameter of particle in the layer A.

Furthermore, it is necessary that the amount contained of the particle (b) in the layer B is, in view of blocking prevention, slipperiness, and further, sensitivity improvement when made into a receiving sheet, 0.05 to 5 mass % with respect to the total amount of layer B. When the amount contained is less than 0.05 mass % the blocking prevention or slipperiness may not be improved, a crease is easily produced on a winder at winding the film or on a slitter, and slipperiness with metal roll is not good and the film may break. When the amount contained exceeds 5 mass %, in the film formation process or successive film processing step, the particle may fall off to stain the process, or the film may be stratified to be broken. It is more preferable if the amount contained of particle in the layer B is 0.05 to 3 mass %.

As the inorganic particle which can preferably be added to the skin layer (layer B), wet and dry silica, colloidal silica, aluminum silicate, titanium oxide, calcium carbonate, calcium phosphate, barium sulfate, aluminium oxide, magnesium carbonate, zinc carbonate, titanium oxide, zinc oxide (zinc white), antimony oxide, cerium oxide, zirconium oxide, tin oxide, lanthanum oxide, magnesium oxide, barium carbonate, zinc carbonate, basic lead carbonate (white lead), barium sulfate, calcium sulfate, lead sulfate, zinc sulfide, mica, titanated mica, talc, clay, kaolin, lithium fluoride, calcium fluoride, etc., can be mentioned. And, as the organic particle, a cross-linked particle of polymethoxysilane, a cross-linked particle of polystyrene, a cross-linked particle of acryl-based compound, a cross-linked particle of polyurethane, a cross-linked particle of polyester, a cross-linked particle of fluoride-based compound, etc., can be mentioned. Furthermore, even not cross-linked, if it is an immiscible resin with the polypropylene resin constituting the layer B, it can be used since it disperses like the particle as an aggregation in the layer. As the immiscible resin, polymethyl pentene, cyclic polyolefin, polycarbonate, polysulfone, polyarylate, isotactic polystyrene, syndiotactic polystyrene, polymethyl methacrylate, saturated polyester, liquid crystal resin, etc., can be mentioned. Among them, as the immiscible resin, it is especially preferable to use polymethyl pentene in view of dispersibility in the polypropylene resin and slipperiness when made into a film. As the polymethyl pentene to be added to the layer B, it is preferable that its melt-flow rate (MFR; 260° C., 5 kg) is 5 to 100 g/10 min. When the MFR is out of such preferable range, coarsely dispersed polymethyl pentene component is formed in the polypropylene, and as the result, coarse voids are formed and the layer B may become easy to be stratified. MFR of the polymethyl pentene is, more preferably 8 to 80 g/10 min, still more preferably 10 to 60 g/10 min. Whereas, the inorganic particle, the organic particle and the immiscible resin may be added singly, or a plurality of them may be added in combination.

It is preferable that a lamination thickness of the skin layer (layer B) is 0.1 to 5 μm. When the thickness of layer B is less than 0.1 μm, crease resistance and emboss resistance may be impaired. And, When the thickness of layer B exceeds 5 μm, sensitivity may become low when used as a receiving sheet. The thickness of layer B is, more preferably, 2 to 5 μm.

Furthermore, it is preferable that the porosity of layer B is, in view of sensitivity and adhesion with the receiving layer when used as a receiving paper, 0.01 to 5%. When the porosity of layer B is less than 0.01%, when used as a receiving sheet, sensitivity decreases and it may be inferior in high speed printability. And, when the porosity of layer B exceeds 5%, surface of the layer B, which is the skin layer of the white polypropylene film, becomes easy to be stratified and when it is processed into a receiving sheet, adhesion with the receiving layer may deteriorate. The porosity of layer B is, more preferably, 0.1 to 3%. Here, the porosity of layer B is the ratio occupied by voids in the skin layer, when the cross-section of the film is observed by an electron microscope. In order to make the porosity of layer B into such preferable range, it is necessary to form proper voids in the layer B, and for that, it is preferable, in film formation process, to set metal drum temperature at casting into the temperature range of 50 to 130° C.

The film may be made into a three layer laminate film of B/A/B type by laminating the layer B on both sides of the core layer (layer A). And, on a surface of the core layer (layer A) opposite to the layer B side, a skin layer (layer C) of which composition is different from that of the layer B may be laminated to make a three layer laminate film of B/A/C type. In case where it was made into the B/A/C type laminate film, when it is processed into a receiving sheet a receiving layer may be provided on layer B side or may be provided on layer C side.

As a resin constituting the layer C, the same resin as that of the layer B may be used or a different one may be used. In case where a receiving layer is provided on the layer C side to use as a receiving sheet, in order to make adhesion with the receiving layer better, it is preferable to use a polypropylene resin of its crystallization temperature is lower than 115° C. as the layer C. When the crystallization temperature is lower than 115° C., it is preferable since hesion tension improving effect by being subjected to a corona discharge becomes high, and adhesion with the receiving layer is improved.

As the polypropylene resin constituting the skin layer (layer C), it is F preferable to be mainly consisted of propylene homopolymer, but unless the purpose of the present invention is impaired, it may be a polymer in which polypropylene and other monomer component of an unsaturated hydrocarbon are copolymerized. And, a polymer in which propylene and monomer component other than propylene are copolymerized may be blended, or a copolymer of monomer components of unsaturated hydrocarbon other than propylene may be blended. As the monomer component constituting such copolymerization component or blended material, the same component as the layer A and layer B can be mentioned. In case where a receiving layer is provided on the layer C, it is especially preferable to use a low stereospecificity polypropylene or a ethylene propylene random copolymer or the like, in order to make co-drawability with the core layer (layer A) and adhesion with the receiving layer compatible.

It is preferable that a stereospecificity (mesopentad) of the low stereospecificity polypropylene is, in view of adhesion with the receiving layer, 70 to 90%. If the mesopentad is less than 70%, when a receiving layer is formed on the layer C to use as a receiving sheet for thermal transfer recording, the heat resistance against heat from thermal head is inferior, and sensitivity may become low. On the other hand, if the mesopentad exceeds the above-mentioned range, for example, when a receiving layer is formed on the layer C to use as a receiving sheet for thermal transfer recording, adhesive strength with the receiving layer may substantially be not improved. The mesopentad is, more preferably, 72 to 85%. And, since there may be a case in which adhesive strength with the receiving layer is further improved, ethylene may be copolymerized with the low stereospecificity polypropylene.

On the other hand, it is preferable that the copolymerization amount of ethylene of the ethylene.propylene random copolymer is 1 to 4 mass %. If the copolymerization amount of ethylene is less than 1 mass %, for example, when a receiving layer is formed on the layer C to use as a receiving sheet for thermal transfer recording, adhesive strength with the receiving layer (or anchor layer) may not substantially be improved. When the copolymerization amount of ethylene exceeds 4 mass %, a sticking may occur in film formation process to stain the film formation process, and the surface may be roughened to cause a surface defect. And, when a receiving layer is formed on the layer C to use as a receiving sheet for thermal transfer recording, heat resistance against heat from thermal head is poor, and depending on transferred energy, sensitivity may become low. The copolymerization amount of ethylene is, more preferably, 1 to 3 mass %.

It is preferable that the layer C contains, for the above-mentioned same reason as that of the layer B, particles of an average dispersed diameter of 1 to 4 µm. It is preferable to that the particle to be added to the layer C is the same as that of the layer B.

It is preferable that a porosity of the layer C is 0.01 to 5%. If the porosity of the layer C is less than 0.01%, when used as a receiving sheet, sensitivity may lower and high speed printability may become inferior. If the porosity of the layer C exceeds 5%, the surface of layer C may become easy to be stratified, and when processed into a receiving sheet for thermal transfer recording, adhesion with the receiving layer may be impaired. The porosity of layer C is, more preferably, 0.1 to 3%. Here, the porosity of layer C can be, like the layer B, determined by observing by a scanning electron microscope. In order to make the porosity of layer C into such preferable range, it is necessary to form a moderate amount of voids in the layer C, and for that, it is preferable, in the film formation process, to set metal drum temperature at the time of casting to the temperature range of 60 to 130° C. It is preferable that a lamination thickness of the layer C is 0.1 to 5 µm. When the thickness of layer C is less than 0.1 µm, crease resistance and emboss resistance may be impaired. And, if the lamination thickness of layer C exceeds 5 µm, when used as a receiving sheet for thermal transfer recording, sensitivity may be low. The lamination thickness of the layer C is, more preferably, 1 to 3 µm.

As the lamination method of layer C, a co-extrusion, an inline or offline extrusion lamination or the like can be mentioned, but it is not limited to any one of them, and best one may be selected on respective occasions. When laminated simply in three layer constitution of B/A/C type, it is preferable to employ the co-extrusion method.

In the layer A, layer B and layer C of the white polypropylene film of the present invention, in a range which does not impair the film characteristics of the present invention, various kinds of additives such as antioxidants, heat stabilizers, antistatic agents, slipping agents, antiblocking agents and fillers may be contained.

It is preferable that an emboss depth of the white polypropylene film of the present invention is 20 µm or less. Here, the emboss depth is a value determined, when thickness of a receiving sheet, in which the white polypropylene film of the present invention is used as the base, is measured for 10 points and average thickness ($t_0$) is determined, and then, when it is printed while changing concentration for image evaluation from white color to black color in 16 gradation by a printer for thermal transfer recording, from the difference between the thickness before printing ($t_0$) and a thickness ($t_1$) of a high gradation region (most concentrated black portion) by the following equation.

$$\text{Emboss depth (µm)}=t_0-t_1$$

Furthermore, as a simplified evaluation, after the white polypropylene film is pasted with a spray bond on one surface of a commercially available receiving sheet for thermal transfer recording, it can also be determined by printing in the above-mentioned way.

The emboss depth is, more preferably, 10 µm or less and, still more preferably, 5 µm or less. If the emboss depth exceeds 20 µm, when printed an image on the receiving sheet for thermal transfer recording, a concavity may be made in high concentration portion to be appeared like a streak.

It is preferable that a porosity of the white polypropylene film of the present invention is 20% or more. By making the porosity 20% or more, mechanical characteristics of the film becomes moderately high, and in the film production process or successive processing step into a reflection plate or a receiving sheet, windability or processability is excellent, and a sensitivity as a receiving sheet for thermal transfer recording, furthermore, a light reflectance of the reflection plate can be made high.

The porosity of the white polypropylene film can be controlled by the β crystal nucleating agent, which is preferably added to the polypropylene of layer A which is the core layer, an amount contained of the particle or a thickness ratio of the core layer (layer A) and the skin layer (layer B and layer C), etc. In addition, in the film formation process, the porosity can be controlled by crystallization conditions (metal drum temperature, peripheral speed of metal drum, thickness of undrawn sheet to be obtained, etc.) when the molten polymer is solidified in casting process, or by drawing process conditions (drawing direction, drawing system such as sequential biaxial drawing or simultaneous biaxial drawing, ratio, speed, temperature, etc.), in addition, by heat treatment conditions, etc. Concretely, in casting process, in order to form uniform and much amount of β crystal in the layer A, it is preferable to make metal drum temperature into 60 to 130° C., more preferably, 70 to 120° C. In the drawing process, when an areal ratio which is the product of drawing ratios of longitudinal direction and transverse direction is made high, the porosity becomes high, in particular, it is preferable to make the longitudinal drawing ratio into 3.5 to 5 times, more preferably into 3.8 to 4.5 times.

As the porosity becomes high, the sensitivity when processed into a receiving sheet is apt to be high, and it is preferable. However, when the porosity exceeds 80%, in film production process or in successive processing step, film may be expanded, may be creased or may be broken and crease resistance and emboss resistance may be impaired. The porosity is, more preferably 25 to 70%, still more preferably, 30 to 65% and most preferably, 35 to 60%.

In the white polypropylene film of the present invention, in view of excellent appearance when made into a receiving sheet, it is preferable that a glossiness of at least one surface is 50% or more. Here, the surface glossiness is the value determined for the surface of layer B or layer C which is the skin layer of the white polypropylene film. Furthermore, in view of realizing a high light reflectance when made into a reflection plate, it is preferable to make the glossiness of the white polypropylene film of 50% or more. Regarding method for achieving surface glossiness of 50% or more, it can be controlled by crystallinity of the polypropylene constituting the white polypropylene film or other material composition, crystallization conditions when molten polymer is solidified in casting process or drawing conditions in drawing process, etc. The surface glossiness is, in view of compatibility of smoothness and porosity of the skin layer, more preferably, 60 to 130%, still more preferably, 70 to 120%.

Furthermore, in the biaxially oriented white polypropylene film of the present invention, in view of handling of the film, it is preferable that a kinetic friction coefficient, when front and back of the film are superposed, is in the range of 0.2 to 0.6. When the kinetic friction coefficient is less than 0.2, it is too slippery and a winding deviation may occur, on the contrary, when it exceeds 0.6, slipperiness deteriorates and the film may be creased in the film formation process or in the successive processing step. In order to make the kinetic friction coefficient in the range of 0.2 to 0.6, it is preferable to make an average surface roughness (Ra) of at least one surface into 0.01 to 0.5 μm. Regarding method for making Ra into such preferable range, like other characteristics, it can be controlled by crystallinity of the polypropylene used, or film production conditions, etc. Ra is, more preferably, 0.05 to 0.4 μm, and still more preferably, 0.1 to 0.3 μm.

In the white polypropylene film of the present invention, in view of sensitivity when used as a receiving sheet for thermal transfer recording, it is preferable that the b value of the sample measured by the reflection method is −7 to −0.1. If the b value exceeds −0.1, when used as a receiving sheet for thermal transfer recording, yellowish tone of an image may strongly appear as a whole, and especially, appearance of a low color such as skin color may not be good. And, when the b value is lower than −7, bluish tone of an image may strongly appear. The b value is, more preferably, in the range of −6.5 to −0.3. As method to make the b value into such preferable range, it can be controlled by adding amount of β crystal nucleating agent, or diameter and adding amount of the particle which are added to polypropylene of the layer A, and diameter or adding amount of the particle of the core layer (layer A) and the skin layer (layer B and layer C), in addition, by ratio of the lamination thickness. And, it can also be controlled by casting conditions or drawing conditions of the film formation process.

It is preferable that the white polypropylene film of the present invention has, in view of sensitivity when used as a transfer sheet, a cushion factor of 15 to 30%. When the cushion factor is less than 15%, sensitivity may be too low, and on the contrary, when the cushion factor exceeds 30%, crease resistance or emboss resistance may be impaired. The cushion factor can also be controlled by polypropylene resin used as the polypropylene film or by shape and amount of the particle to be added thereto, in addition, by film production conditions. The cushion factor is, more preferably, 17 to 25%.

In the white polypropylene film of the present invention, a light reflectance at wavelength of 560 nm is preferably 85% or more, more preferably 90% or more. If the light reflectance is less than 85%, when used as a reflection plate, illumination efficiency of light source is inferior and the liquid crystal screen may become dark.

In the white polypropylene film of the present invention, it is preferable that the film thickness is 10 to 100 μm, in view of stability of film production of the white polypropylene film, or sensitivity and compatibility of crease resistance and emboss resistance when used as a receiving sheet. It is more preferable if the film thickness is 20 to 60 μm.

It is preferable that at least one surface of the white polypropylene film of the present invention is subjected to a corona discharge treatment to make wet tension of the film surface 35 to 60 mN/m, in view of adhesion of the treated surface with a receiving layer, furthermore adhesion with other material. When the corona discharge treatment is carried out, as an atmospheric gas, it is preferable to carry out in a gas atmosphere of at least one kind selected from air, oxygen, nitrogen and carbon dioxide gas. Among them, in view of improvement of adhesion, it is preferable to treat surface under nitrogen atmosphere, or under a mixed atmosphere of nitrogen/carbon dioxide gas. The surface wet tension is, more preferably, 37 to 60 mN/m. In case where the surface wet tension exceeds 60 mN/m, due to an excessive surface treatment, the surface may deteriorate to degrade adhesion on the contrary.

In case where the white polypropylene film of the present invention is used as a base of a receiving sheet for thermal transfer recording, it is preferable that a glossiness of the receiving layer surface after a receiving layer is coated on the film is 50% or more, since an image becomes bright when the image is printed on the receiving sheet. A glossiness of the receiving layer surface is, more preferably 70% or more. Since, as the glossiness of the receiving layer surface becomes high, its image becomes bright and preferable, an upper limit is not especially provided.

In case where the white polypropylene film of the present invention is used as a base of a receiving sheet for thermal transfer recording, said receiving sheet for thermal transfer recording may be a receiving sheet made of the white polypropylene film alone, or may be a receiving sheet laminated with other material. As the other material, a paper such as an ordinary paper, a high quality paper, a medium quality paper, a coated paper, an art paper a cast-coated paper, a resin impregnated paper, an emulsion impregnated paper, a latex impregnated paper, a paper containing internal synthetic resin, a paraffin paper, a laminate paper, etc., a synthetic paper, a non-woven fabric, or other kind of film, etc., can be mentioned. And, in case where the white polypropylene film of the present invention is laminated to other material, it is preferable to laminate to the surface opposite to surface on which a receiving layer of film is provided, since a curl of the receiving sheet for thermal transfer recording is small.

As drawing methods of the biaxially oriented white polypropylene film of the present invention, longitudinal-transverse or transverse-longitudinal sequential biaxial drawing method, simultaneous biaxial drawing method, and further, re-drawing after the biaxial drawing, etc., can be employed, but it is preferable to employ the longitudinal transverse sequential biaxial drawing method excellent in productivity and equipment expansibility.

In the following, the production method of the white polypropylene film of the present invention in which the longitudinal-transverse sequential biaxial drawing method is employed is explained with reference to concrete examples, but the film of the present invention is not limited to such examples only.

As a core layer (layer A) resin, a polypropylene resin having β-crystal activity is fed to an extruder (a) by adding a β crystal nucleating agent and a particle of its average dispersed diameter is in the range of 60 to 400 nm, melt-kneaded at 180 to 300° C., and after filtering by a filter, it is introduced to a composite die. On the other hand, as a skin layer (layer B) resin, a polypropylene of which crystallization temperature is raised by adding a high melt strength polypropylene is fed to an extruder (b), melt-kneaded at 180 to 280° C., and after filtering by a filter, introduced in the composite die to laminate on one surface or on both surfaces of the layer A. At this time, when a skin layer (layer C) of a composition different from that of the layer B is laminated, by using an independent extruder (c), a resin of the layer C is melt-kneaded at 180 to 280° C., and after filtering by a filter, laminated in the composite die on the surface opposite to the skin layer (layer B) which is laminated on one surface of the core layer (layer A) to make a constitution of layer B/layer A/layer C.

The composite sheet in which these molten polymer is laminated is extruded from the die and solidified by closely contacting with a drum maintained at 40 to 120° C. In case where the drum temperature and the actual temperature of the sheet is approximately the same, since as the drum temperature becomes high, β crystal ratio of the layer A becomes high in the above-mentioned temperature range, apparent porosity of film after biaxial drawing may increase to lower specific gravity. However, if the drum temperature is too high, the sheet may stick to the drum to arise a case in which a crater-like defect generates on surface of the film which contacted with the metal drum (drum side surface, hereafter, abbreviated as D surface) after the biaxial drawing. In case where crystallization temperature of the layer B is 115° C. or higher, by casting such that the film contacts with metal drum, it becomes possible to prevent sticking of the sheet to the drum, and further, to increase the β crystal ratio of the undrawn sheet. And, a crater-like defect is not generated on the layer B surface which is the D surface after biaxial drawing. Furthermore, by drawing the undrawn sheet of which β crystal ratio is high, it becomes possible to obtain a film of a high porosity even when the longitudinal drawing temperature is set high.

When a casting is carried out, it is preferable that a contact time of the extruded molten polymer with the metal drum is 3 to 60 seconds. Whereas, in case where the polymer is solidified by a plural number of metal drums, the contact time is the time from the point of contact with the first drum to the point of leaving from the last drum of the undrawn sheet. When the contact time with the metal drum is less than 3 seconds, there may be cases in which solidification become insufficient and the sheet sticks to the metal drum, or, since the production of the β crystal ratio is low, porosity of the film after the biaxial drawing decreases. On the contrary, even when the contact time to the metal drum exceeds 60 seconds, the effect may saturate. The contact time with the metal drum is, more preferably, 5 to 45 seconds, still more preferably, 7 to 20 seconds.

At the time of casting, as method for closely contacting the molten polymer with the metal drum, any means such as static discharge method, closely contacting method utilizing surface tension of water, air-knife method, press-roll method, cast-in-water method, may be employed, but as means for obtaining the white polypropylene film of the present invention, it is preferable to employ the air-knife method which is good in thickness control and capable of controlling cooling speed of film surface by the temperature of blowing air. As the air temperature, it is preferable to set to 10 to 130° C., and as the temperature becomes low, the glossiness increases, and, as the temperature becomes high, the porosity increases.

Next, in order to form voids in layer A of the film, the undrawn laminate sheet is preheated by introducing to a group of rolls or an oven heated to 90 to 160° C., and after raising the film temperature into 80 to 150° C., it is drawn 3 to 7 times in the film longitudinal direction between a roll of which surface temperature is controlled to 80 to 145° C. and a roll controlled to 30 to 140° C., by utilizing a difference of peripheral speed of the rolls, and cooled by rolls of 30° C. to 120° C. At this time, when the film temperature is low, porosity increases, and, when the drawing ratio is high, porosity also increases.

Successively, it was introduced into a tenter while both edge of the film which was drawn in longitudinal direction were grasped by clips, and drawn 5 to 12 times in film transverse direction in an atmosphere heated to 120 to 190° C. (film temperature: 100° C. to 165° C.). If the atmospheric temperature of the transverse drawing is lower than 120° C., the film may become easy to be broken. And, when the atmospheric temperature of the transverse drawing exceeds 190° C., the voids formed by the longitudinal drawing may be crushed to decrease the porosity, or the skin layer may stick to the clips to be broken.

Whereas, in such drawing process, it is preferable to draw in a longitudinal drawing speed in the range of 20,000 to 300,000%/min, and in a transverse drawing speed in the range of 1,000 to 10,000%/min, since the void formation efficiency is high and it is possible to form uniform voids in the longitudinal and transverse direction. When the longitudinal-transverse drawing speed is lower than the above-mentioned range, production per unit time decreases to bring about a cost-up. When the longitudinal-transverse drawing speed exceeds the above-mentioned range, number of voids formed may decrease to lower the porosity.

Furthermore, it is preferable that an areal ratio of the longitudinal-transverse biaxial drawing (longitudinal drawing ratio×transverse drawing ratio) is 15 to 84 times, and in view of stability of the film production, to be 30 to 50 times is more preferable. When the areal ratio is less than 15 times, the surface glossiness of the white polypropylene film after the biaxial drawing may be low, or the formation of void may be insufficient. And, when the areal ratio exceeds 84 times, the film may be broken at the drawing.

The biaxially drawn white polypropylene film of the present invention is, successively, in order to improve smoothness and dimensional stability by completing crystal orientation, subjected to a heat treatment in a tenter at 140 to 170° C. for 1 to 30 seconds. Then, after cooling uniformly and slowly, it is possible to obtain a film by cooling to a room temperature and by winding. Whereas, in the heat treatment process, as required, it may be subjected to a relaxation treatment of 3 to 12% in transverse direction or longitudinal direction. And, in order to increase interlayer adhesive strength at a coating of the receiving layer or at a lamination with other base, it is preferable to wind after carrying out a corona discharge treatment to the film surface.

Whereas, in the production process of the white polypropylene film, it is possible to coat and provide a surface improving layer. That is, the-in-line coating method, in which a corona discharge treatment is carried out on a film drawn in longitudinal direction in order to increase wettability, and an acryl resin, a polyester resin, a polyurethane resin, etc., is coated, and successively introduced in a tenter, drawn transversely and dried, is preferably employed since a surface improving layer can be provided in a low cost.

[Determination Method and Evaluation Method of Characteristics]

The values of various characteristics in the present invention are determined by the following evaluation methods and evaluation criteria.

(1) Number of voids, having particle as nucleus, in cross-section of the core layer (layer A)

Number of voids, having particle as nucleus, in the core layer (layer A) was determined as follows.

By a resin embedding method using an epoxy resin, using an ultra-microtome, an ultra-thin section sample, of the cross-section in transverse direction-thickness direction of a white polypropylene film, was obtained. The obtained section sample was dyed by $RuO_4$, and the cross-section was observed by a transmission electron microscope in the following conditions.

Instrument: Transmission electron microscope H-7100FA produced by Hitachi, Ltd.
Acceleration voltage: 100 kV
Observation magnification: 10,000 times Regarding layer A of the film, a photograph is taken such that one side of the photograph is parallel to transverse direction of the film, and observed parallel to thickness direction (10 mm in the photographic paper corresponds to actual 1 μm). The obtained photograph was read in the following conditions by using a scanner.

Scanner: GT-7600U produced by Seiko Epson Corp.
Software: Epson Twain ver.4.20J
Image type: line drawing
Resolution: 600 dpi From the obtained image, for an arbitrarily selected 10 μm×10 μm range, number of voids having a particle as a nucleus was counted by carrying out an image analysis by using Image-Pro Plus, Ver. 4.0 for Windows produced by Pranetron Inc. At this time, voids on the boundary line were counted as the number. At this time, a space calibration was carried out by using a scale taken in the cross-section image. By changing the position, the number was counted for 10 positions, and their average value was taken (2) Specific Gravity of Film By using a high precision electronic densimeter (SD-120L produced by Mirage Trading Co., Ltd.), for a sample cut into a size of 30 mm×4 mm, a measurement was carried out in an atmosphere of 23° C., relative humidity 65%. Measurements were carried out for samples taken from arbitrarily selected 5 positions of the same film, and average of the measured values was taken as the specific gravity of said film.

(3) Specific Gravities of Undrawn Sheet and Hot Press Sheet

It was measured according to D method (density gradient tube method) of JIS K7112 (1999). For a sheet of which specific gravity is 1 or less (i.e., those to which a resin immiscible with polypropylene, or inorganic particle or organic particle was not added), ethanol (guaranteed reagent) and purified water were selected as liquids, and for a sheet of which specific gravity is higher than 1 (i.e., those to which immiscible resin, inorganic particle or organic particle was added), aqueous solution of sodium bromide and purified water were selected as liquids to prepare a density gradient tube. Temperature of the density gradient tube was control to 25° C., and a sample cut into 5 mm square was put therein to measure its specific gravity. For the same sample, test pieces were cut out from arbitrarily selected 5 positions and measurements were carried out, and average of the obtained values of specific gravity was taken as the specific gravity of said sample.

(4) Porosity of Biaxially Oriented White Polypropylene Film

The porosity of the white polypropylene film was determined by the equation described below, by utilizing the specific gravity (d1) of the white polypropylene film determined by the method of the above-mentioned (2) and the specific gravity (d0) determined by the method of the above-mentioned (3) for a hot press sheet obtained by pre-heating this white polypropylene film for 3 minutes and heating for 2 minutes under a pressure of 10 MPa, by a hot press heated to 280° C., to completely exclude voids and quenching by immersing in 30° C. water.

Porosity (%)=(1−$d1/d0$)×100

(5) Confirmation of β-Crystal Activity

[Confirmation for Entire Film]

In the present invention, if the layer A has β-crystal activity or not is decided by measuring entire white polypropylene film by the following criteria.

5 mg white polypropylene film was filled in an aluminum pan and measured by using a differential scanning calorimeter (model RDC220 produced by Seiko Instruments Inc.). In the measurement, the film was heated under nitrogen atmosphere at a rate of 20° C./min from 30° C. to 260° C. (first run), and maintained at 260° C. for 5 minutes. Successively, it was cooled to 30° C. at a rate of 20° C./min and maintained at 30° C. for 5 minutes. Next, it was heated again at a rate of 20° C./min up to 260° C. (second run). In the calorie curve of the second run, in case where an endothermic peak accompanied with fusion of β crystal having a peak at 140 to 160° C. is observed, it was decided that said film has β-crystal activity. Whereas, the endothermic peak mentioned here means a peak of its quantity of heat of fusion is 10 J/g or more. And, the quantity of heat of fusion can be calculated from the area surrounded by the baseline and the calorie curve from where the calorie curve deviates from the baseline to the endothermic side along with the temperature elevation to where it next returns to a position of the baseline. By drawing a straight line from the position of starting temperature of the fusion to the intersection of high temperature side where the calorie curve returns to the baseline, it can be determined by comparison of the peak area with the quantity of heat of fusion (28.59 J/g) when indium, which is reference material, is measured. Whereas, in case where, in the calorie curve, a peak appears again in the endothermic side after a peak appears and before the curve returns to the baseline, a vertical line is drawn at the temperature position where the differential value of the calorie curve becomes 0 (the temperature where the calorie curve becomes minimum value to the endothermic side) from the calorie curve to the baseline, and from the area surrounded by the calorie curve, the baseline and the vertical line, the quantity of heat of fusion of β crystal was determined.

Furthermore, in the above-mentioned means, in case where a peak of fusion having its peak at 140 to 160° C. is present, but it is not clear if it is based on the fusion of β crystal or not, it may be confirmed that a film has β-crystal activity by, for a sample prepared in the following conditions, that the diffraction peak based on β crystal is present in diffraction profile obtained by 2θ/θ scan by wide angle X-ray diffraction method, and by that the K value calculated from each diffraction peak intensity is 0.3 or more.

Measuring conditions of the wide angle X-ray diffraction method are follows.

Sample: After films were superposed in a same direction such that a sample thickness after hot press processing would be approximately 1 mm, this was sandwiched between 2 aluminum plates of 0.5 mm thickness, fused and compressed by a hot pressing at 280° C. to render the polymer chain into almost no orientation. The obtained sheet was, just after taken out together with the aluminum plates, immersed in boiled water for 5 minutes to crystallize, and then a sheet obtained by cooling in an atmosphere of 25° C. was cut into a sample of 1 mm width and provided to the measurement.

X-ray diffraction apparatus: 4036A2 produced by Rigaku Denki Co., Ltd.
X-ray source: CuKα ray (Ni filter was used)
Output: 40 kV, 20 mA
Slit system: 2 mmφ −1°−1°
Detector: Scintillation counter
Count recorder: Model RAD-C produced by Rigaku Denki Co., Ltd.
Measuring method: 2θ/θ scan (step scan, 2θ range 10 to 55°, 0.05° step, integrated time 2 seconds).

Here, K value can be calculated by the equation described below from a diffraction peak intensity ($I\beta_1$) of β crystal (300) plane observed around 2θ=16°, and diffraction peak intensities ($I\alpha_1$, $I\alpha_2$ and $I\alpha_3$, respectively) of α crystal (110), (040) and (130) planes observed around 2θ=14, 17 and 19° respectively. Whereas, K value is an empirical value indicating β crystal ratio, and concerning details of K value such as calculation of the respective diffraction peak intensities, A. Turner Jones, et. al., Makromolekulare Chemie, 75, 134 (1964) may be referred to.

$$K = I\beta_1 / \{I\beta_1 + (I\alpha_1 + I\alpha_2 + I\alpha_3)\}$$

Whereas, the above-mentioned confirmation may be determined not only for a film after biaxial drawing, or for a corresponding undrawn sheet.

In the present invention, in the above-mentioned method, films having β-crystal activity were classified as good, those not having β-crystal activity were classified as bad.

[Confirmation Relating to Core Layer (Layer A) and Skin Layer (Layer B and Layer C)]

By the same means as the above-mentioned, for the resin materials used as the core layer (layer A) and skin layer (layer B and layer C), calorie curves were obtained by using a differential scanning calorimeter, and decided. Whereas, the resin material mentioned here means the entire resin composition including polypropylene, other polymers and additives used for forming respective layers. Whereas, regarding shape of sample, although any shape may be allowed, chip-like shape is preferable since its handling is easy. And, from a white polypropylene film after the film production, the layer B and layer C which are skin layers may be shaved and provided to measurements as samples.

(6) Evaluation of Biaxial Orientation

State of orientation of film is evaluated by X-ray diffraction photograph in which X-ray is incidented to the film from the 3 directions indicated below.

Through incidence: Incidence normal to surface formed by longitudinal direction and transverse direction of film
End incidence: Incidence normal to surface formed by transverse direction and thickness direction of film
Edge incidence: Incidence normal to surface formed by longitudinal direction and thickness direction of film Whereas, samples were superposed in a same direction and after adjusted to approximately 1 mm thickness, they were cut into approximately 1 mm width and provided to the measurement.

X-ray diffraction photograph was measured by imaging plate method under the following conditions.
X-ray generator: Model 4036A2 produced by Rigaku Denki Co., Ltd.
X-ray source: CuKα ray (Ni filter was used)
Out put: 40 Kv, 20 mA
Slit system: 1 mmφ pinhole collimator
Imaging plate: FUJIFILM BAS-SR
Photographing conditions: Camera radius 40 mm, exposure time 5 minutes Here, regarding evaluation of no orientation, uniaxial orientation and biaxial orientation of a film, for example, as interpreted by Kiyokazu Matsumoto et al., Journal of Fiber Science and Technology, Japan, No. 26, p 537 (1970), Kiyokazu Matsumoto, "Making Film", Kyoritsu Shuppan, Tokyo (1993), p 67-86, Seizo Okamura, Akio Nakajima, Shigeharu Onogi, Hiromichi Kawai, Yasunori Nishijima, Toshinobu Higashimura, Norio Ise, "Kobunshi Kagaku Joron (second edition)", Kagakudojin, Kyoto (1981), p 92-93, etc., it can be evaluated by the following criteria.

No orientation: Debye-Scherrer ring of equal intensity is obtained in X-ray diffraction photograph of every direction.
Longitudinal uniaxial orientation: Debye-Scherrer ring of equal intensity is obtained in X-ray diffraction photograph of end incidence.
Biaxial orientation: Diffraction pattern of unequal intensity reflecting each orientation is obtained in every direction of X-ray diffraction photograph.

(7) Crystallization Temperature (Tc) of Skin Layer

It was measured by using a differential scanning calorimeter (thermal analyzer model RDC220 produced by Seiko Instruments & Electronics Ltd.). Under a nitrogen atmosphere, 5 mg resin of skin layer (layer B and layer C) was heated from 30° C. to 280° C. at a rate of 10° C./min, and maintained at 280° C. for 5 minutes. Successively, cooled to 30° C. at a rate of 10° C./min. At this time, the peak temperature of exothermic peak accompanied with crystallization from molten state was taken as the crystallization temperature (Tc). Whereas, it is preferable that the sample has a chip-like shape, but it may be prepared by shaving a skin layer only from a white polypropylene film. The measurements was carried out 5 times, and average of the obtained values was taken as the crystallization temperature (Tc) of said sample.

(8) Porosity of Skin Layer (Layer B and Layer C)

By the same method as the above-mentioned (1), the cross-section of skin layer of a white polypropylene film was continuously observed while changing position to be observed in parallel to transverse direction, and 10 cross-section images were taken.

On the each cross-section image obtained, OHP sheet (OHP sheet exclusive for EPSON produced by Seiko Epson Corp.) was placed, and only voids in skin layer were painted in black with a permanent marker from over the OHP sheet. The image of OHP sheet thus obtained was read by using a scanner under the following conditions.

Scanner GT-7600U produced by Seiko Epson Corp.
Software: EPSON TWAIN ver.4.20J
image type Line drawing
Resolution 600 dpi The obtained image was subjected to an image analysis by using Image-Pro Plus, Ver.4.0 for Windows produced by Pranetron Inc. At this time, a space calibration was carried out by using the scale of the cross-section image taken. The measurement conditions were set as follows.

In the display option in the count/size option settings, the outline mode is set to "paint out."
In the object extraction option, the exclusion on boundary is set to "None".
In the brightness range selection for measurement, the dark color object is set to "automatic extraction".

Under the above-mentioned conditions, a ratio of the area painted in black with respect to the total area of the skin layer of the 10 cross-section images, that is, the rectangular objective region which was subject of the measurement, was calculated in percentage, and it was taken as the porosity.

(9) Average Surface Roughness (Ra) of Film Surface

According to JIS B 0601 (2001), by using a stylus type surface roughness meter (high precision thin film level difference measuring instrument ET-30HK and three-dimensional roughness analyzer SPA-11 produced by Kosaka Laboratory Ltd.), surfaces of skin layer (layer B and layer C) of a white polypropylene films were subjected to measurements in the following conditions.

Stylus scanning direction: Transverse direction of film
Measuring mode: Stylus type
Mode of treatment: 8 (Roughness)
Measuring length 1 mm
Stylus diameter: Circular cone type 0.5 μmR
Load: 16 mg
Cutoff: 250 μm
Number of line measured: 30 lines
Scanning speed: 100 μm/seconds
Pitch: X direction 4 μm, Y direction 10 μm
Slope comp: On
Gain: ×1
Area measured: 0.2988 mm$^2$
Standard area: 0.1 mm$^2$ At the measurement, as required, roughness curves were recorded by using a recorder. Conditions at that time were as follows.

Recording magnification in X·Y axis direction: 100 times
Magnification in Z axis direction: 10,000 times (it may be 5,000 times as required, in case where a magnification of roughness curve is too large on recorder)
Recorder speed: 40 μm/seconds
Y recording pitch: 2 mm At this time, center line average surface roughness (Ra) is, when a portion of measuring length L is taken out from the roughness curve and the center line of this taken out portion is taken as X axis, the vertical direction is taken as Y axis and the roughness curve is expressed as y=f(x), the value determined by the following equation.

$$Ra = (1/L)\int |f(X)| dx$$

For the same film, measurements were carried out at arbitrarily selected 5 positions, and average of the obtained values was taken as Ra of said film.

(10) Optical Density

It was measured by using an optical density meter TR-927 produced by Macbeth AG. For the same film, same measurement were carried out 5 times, and average of the obtained values was taken as optical density of said film.

(11) Surface Glossiness

According to JIS Z 8741 (1997), by using a digital variable gloss meter, UGV-5D produced by Suga Test Instruments, Co., Ltd., under conditions of incident and emission angles of 60°, surface glossiness was measured for surface of skin layer (layer B and layer C) of a white polypropylene film. For the same film, measurements were carried out at arbitrarily selected 5 positions, and average of the obtained surface glossinesses was taken as surface glossiness of said film.

(12) b Value

By using spectrocolorimeter SE-2000 produced by Nippon Denshoku Industries Co., Ltd., under conditions of the reflection method, b value was measured. Whereas, the measurement was carried out by using a φ30 mm sample stage and a lens. For the same film, measurement were carried out at arbitrarily selected 5 positions, and average of the obtained b values was taken as b value of said film.

(13) Isotactic Index

Isotactic index is determined from an extraction residue of boiling n-heptane. A cylindrical filter paper was dried at 110±5° C. for 2 hours, and after standing 2 hours or more in a room of 23° C. and relative humidity 65%, a sample (polypropylene such as of powder or flake) 10 g is put into the cylindrical filter paper, and by using a measuring cup and tweezers, mass of the sample (Po) is precisely weighed by a direct-reading balance to four places of decimals.

This is put into upper portion of an extractor to which heptane 80 ml is added, and the extractor and a condenser are assembled. The extractor is heated by an oil bath or an electric heater to extract for 12 hours. The heating is controlled such that the number of drops from the condenser in 1 minute is 130 drops or more. The cylindrical filter paper containing extraction residue is taken out, and put into a vacuum drier to dry at 80° C. and under a degree of vacuum of 100 mmHg or less for 5 hours. After the drying and after standing in a room of 23° C. and relative humidity 65% for 2 hours, mass (P) of the sample is precisely weighed, and isotactic index is calculated by the following equation. Here, Po is the mass of sample before the extraction and P is the mass of sample after the extraction.

$$\text{Isotactic index (\%)} = (P/Po) \times 100$$

Measurements were carried out 5 times, and average of the obtained values was taken as isotactic index of said sample.

(14) Melt-Flow Rate (MFR)

MFR of polypropylene and thermoplastic elastomer is determined according to the condition M (230° C. and 2.16 kg) of JIS K 7210 (1995). Ethylene resin is determined according to the condition D (190° C. and 2.16 kg) of JIS K 7210 (1995). MFR of polymethyl pentene is determined according to ASTM D 1238 (260° C. and 5.0 kg).

(15) β Crystal Ratio

[β Crystal Ratio of Undrawn Sheet]

According to the determination method described in the above-mentioned (5), for a sample of undrawn sheet, calorie curve of the first run is taken.

[β Crystal Ratio of Biaxially Oriented White Polypropylene Film]

According to the determination method described in the above-mentioned (5), for samples of white polypropylene film and respective layers of core layer (layer A) and skin layer (layer B and layer C), calorie curves of the second run are taken.

[Calculation of β Crystal Ratio]

It is determined, in the calorie curves respectively obtained, from quantity of heat of fusion (ΔHβ) calculated from the endothermic peak area having a peak at 140 to 160° C. which is accompanied with fusion of β crystal, and quantity of heat of fusion (ΔHα) based on polypropylene having a peak at 160° C. or higher caused by crystal fusion other than β crystal, by the equation described below. At this time, there may be a case in which a very small exothermic or endothermic peak is observed between the peak of fusion ΔHβ and the peak of fusion ΔHα, but this peak may be ignored. The measurements were carried out 5 times, respectively, and average of β crystal ratios obtained was taken as β crystal ratio of said sample. Whereas, β crystal ratio of the undrawn sheet is important to evaluate how many β crystals were produced in the casting process. Accordingly, β crystal ratio of the undrawn sheet is calculated from calorie curve of the first run which reflects thermal history received by the sample at the time of film production. And, β crystal ratio of the biaxially oriented film is important to evaluate how much each film has void formability. Accordingly, β crystal ratio of the biaxially oriented film is calculated from calorie curve of the second run which is not affected by the thermal history which the film received. In the present invention, as far as not mentioned especially, as β crystal ratio, a value calculated from calorie curve of the second run for biaxially oriented film was used.

$$\beta\text{crystal ratio (\%)}=\{\Delta H\alpha/(\Delta H\alpha+\Delta H\beta)\}\times 100$$

[βCrystal Ratio of Core Layer (Layer A) and Skin Layer (Layer B and Layer C)]

A sample is prepared by shaving each layer of the core layer (layer A) and skin layer (layer B and layer C) of the white polypropylene film, and it was determined by obtaining calorie curve of the core layer (layer A) and skin layer (layer B and layer C) using a DSC by the same means as the above-mentioned.

(16) Average Dispersed Diameter of Particle in Film

An ultra-thin section (sample) of a cross-section of transverse direction-thickness direction of film was prepared by $RuO_4$ dyeing ultra-thin sectioning method. That is, by using microtome method, an ultra-thin section having the above-mentioned cross-section was prepared, said section was dyed with $RuO_4$ and observed by using a transmission electron microscope (TEM), under the following conditions.

Instrument: Transmission electron microscope (H-7100FA) produced by Hitachi, Ltd.
Acceleration voltage: 100 kV
Magnification of observation: 10,000 times By using the obtained image, minor diameters and major diameters of all particles present in an area of 10 μm×10 μm were measured and average value of all these was taken as average dispersed diameter. And, particles with some parts missing at the edge of the image were not counted. Whereas, the minor diameter and the major diameter mentioned here are lengths of the smallest portion and the largest portion of the values determined along the transverse direction and thickness direction of each particle size observed in the cross-section. This measurement was carried out 10 times while changing cross-section to be observed, and average value thereof was employed.

(17) Primary Average Particle Diameter of Particle

Volume average particle diameter of the particle before adding to polypropylene resin, measured by centrifugal sedimentation method by using CAPA 500 produced by Horiba, Ltd., was taken as the primary average particle diameter.

(18) Thickness of Each Layer Constituting Film

In the above-mentioned (8), while changing observing position, thicknesses of the skin layers (layer B and layer C) were measured at 10 positions, and their average values were taken, respectively, as thickness of the skin layers (layer B and layer C). That is, in each of 10 cross-section photographs, an arbitrarily selected one position was read in actual size of the film, and average value of the values of the total 10 positions was taken as thickness of each skin layer of said film. At this time, as magnification of observation, 10,000 times was employed. And, thickness of the core layer (layer A) was calculated by subtracting thickness(es) of the above-mentioned skin layer(s) from the whole thickness of white polypropylene film determined by item (20) described below.

(19) Amount of Particle Contained

As a solvent, xylene, which dissolves polypropylene resin and thermoplastic resin of film, and does not dissolve particles, was selected. A film of 10 g was dissolved in xylene heated to 135° C., particles were centrifuged and the mass of particles was weighed, and from the mass ratio of the total mass of sample and the mass of particles, the amount of particle contained was determined.

(20) Cushion Factor

A dial gauge type thickness meter (JIS B 7503 (1997), Upright Dial Gauge (0.001×2 mm), No. 25, produced by Peacock Co., probe 5 mmϕ flat type) is equipped with a dial gauge stand (No. 7001DGS-M). Film thickness (d0) is measured by this. Furthermore, the thickness (d500) at the time when a 500 gf (4.9N) load is loaded to the dial gauge probe was measured and the cushion factor was calculated by the following equation.

$$\text{Cushion factor (\%)}=\{(d0-d500)/d0\}\times 100$$

The same measurement was carried out 5 times for the same sample, and average value of the cushion factors was taken as cushion factor of said sample.

(21) Thickness of Film

Thicknesses were measured by using a dial gauge type thickness meter (JIS B 7503 (1997), Upright Dial Gauge (0.001×2 mm), No. 25, produced by Peacock Co., probe 5 mmϕ flat type, load 125 gf (1.23 N)), at 10 positions in longitudinal direction and transverse direction of film in 10 cm interval, and their average value was taken as film thickness of said sample.

(22) Wet Tension

Wet tension was measured by using a mixed solvent of formamide and ethylene glycol monoether, according to JIS K 6768 (1999).

(23) Crease Resistance

A High quality paper with a pressure sensitive adhesive (label sheet for word processor, Tai-2110-W of Kokuyo Co., Ltd.) of 65 μm thickness was uniformly pasted on the surface opposite to the surface for forming a receiving layer of a white polypropylene film to prepare a sample for evaluating creasing resistance. Said sample was cut out into a length 200 mm and a width 15 mm, one end thereof was fixed and another end was pulled at 200 mm/seconds, while folding back 180° with the film surface of said sheet inside with an iron cylindrical core of 5 mm diameter as an axis to which 200 g weight was connected by wire at both sides. Crease generating condition on the film surface was observed at a magnification of 10 times by using a stereo microscope, and crease resistance was determined according to the following criteria.

Class A: 0 to 1 crease/cm having 1 mm or more length generated
Class B: 2 to 4 crease/cm having 1 mm or more length generated.
Class C: 5 to 8 crease/cm having 1 mm or more length generated.
Class D: 9 or more crease/cm having 1 mm or more length generated.

Films industrially applicable for practical use are those determined as class A or class B.

(24) Effective Draw Ratio

On an undrawn sheet cooled to solidify into a sheet obtained by extruding a molten polymer and solidifying on a metal drum, a cross cut pattern of 1 cm pitch was made such that respective sides were parallel to the longitudinal direction and the transverse direction of film. After that, drawing and winding were carried out successively. Lengths (cm) of the cross cut pattern of the obtained film were measured for 10 pitches in longitudinal direction and for 10 pitches in transverse direction, and average values of them were taken as effective draw ratios of longitudinal direction and transverse direction, respectively.

(25) Evaluation of Sticking to Metal Drum in Casting Process

In the casting process, a position where the undrawn sheet is peeled off from metal drum was observed and it is evaluated by the following criteria.

Good: Drum side surface layer of the undrawn sheet does not stick to the drum, and there is no trace of sticking.

Bad: Drum side surface layer of the undrawn sheet sticks to the drum, and there is a trace of sticking.

Films industrially applicable for practical use are those evaluated as good.

(26) Evaluation of Surface Defect

Surface of the white polypropylene film after the biaxial drawing was visually inspected and surface defect was evaluated by the following criteria.

Good: A crater-like defect is not found.

Bad: A crater-like defect is found.

Films industrially applicable for practical use are those evaluated as good.

(27) Sensitivity

A white polypropylene film was pasted on a paper of 150 μm thickness. After that, by using a microgravure coater, the following coating agent was coated for forming a receiving layer on the skin layer (layer B or layer C) of the film surface such that an amount of coating when dried would be 3 g/m$^2$, to thereby prepare a receiving sheet for thermal transfer recording.

[Coating Liquid for Forming Receiving Layer]

Polyester resin ("Vylon (trademark) 200" produced by Toyobo Co., Ltd.): 20 mass parts Silicone oil ("X-22-3000T" produced by Shin-Etsu Chemical Co., Ltd.) 2 mass parts Toluene: 39 mass parts Methyl ethyl ketone: 39 mass parts After preparing the above-mentioned receiving sheet for thermal transfer recording, and after standing for 24 hours at 40° C., a test pattern was printed on the surface, where a receiving layer of the above-mentioned receiving sheet was formed, of the receiving sheet for thermal transfer recording by using a color printer (Professional Color Point 1835 produced by Seiko Instruments Inc.) and an ink ribbon exclusive for that. The same printing was carried out 10 times for the same receiving sheet, and from reproducibility and brightness of image of the obtained sheet, sensitivity was determined by the following criteria.

Class A: Color concentrations of all sheets were high, and images were bright.

Class B: In 1 to 2 times, concentration is slightly low or sheet having a slight "dropout" is found, but other than that, concentration is high and image is bright.

Class C: In 3 to 5 times, concentration is low or "dropout" or "crush" is found, or, as a whole, there is sheet of which reddish tone of image appears strongly or yellowish tone appears strongly.

Class D: In 6 times or more, concentration is low or, "dropout" or "crush" is found, or, as a whole, there is sheet of which reddish tone of image appears strongly or yellowish tone appears strongly.

(28) Emboss Depth

Using a white polypropylene film as a base, a receiving sheet for thermal transfer recording was prepared. The average thickness ($t_0$) was determined by measuring at 10 points of the receiving paper, and after that, it was printed while changing concentration for image evaluation from white color to black color in 1 (white) to 16 (black) gradations by a desktop type small printer for thermal transfer recording (CP-300 produced by Canon Inc.). From the difference between the thickness before printing ($t_0$) and a thickness ($t_1$) of a high gradation region (most concentrated black portion), the emboss depth was determined by the following equation.

$$\text{Emboss Depth (μm)} = t_0 - T_1$$

(29) Emboss Resistance

As an evaluation of the emboss resistance, the emboss depth evaluated in the above-mentioned (28) was evaluated by the following criteria.

A: Emboss depth is less than 10 μm.

B: Emboss depth is 10 to 20 μm.

C: Emboss depth exceeds 20 μm.

(30) Adhesive Strength of Receiving Layer

Cellophane tapes (produced by Nichiban Co., Ltd., 18 mm width) were pasted on the receiving layer side surface and the opposite side surface of the receiving sheet for thermal transfer recording obtained by the above-mentioned (27) in 15 cm length such that they were parallel with each other and confronting at the same portion. After that, the receiving layer side surface was fixed by the non-dominant hand, and the cellophane tape of the receiving layer side was quickly peeled off by pulling it in a direction of approximately 45° by the dominant hand. At this time, a ratio of receiving layer transferred to the cellophane tape (including other layers of the receiving sheet) was observed and evaluated by the following criteria.

A: The receiving layer is not transferred to the cellophane tape at all or the film itself is aggregated and destroyed due to strong adhesive strength between the receiving layer (or anchor layer) and the film.

B: Less than 20% of the receiving layer is transferred to the cellophane tape.

C: 20% or more and less than 50% of the receiving layer of is transferred to the cellophane tape.

D: 50% or more of the receiving layer is transferred to the cellophane tape.

Films industrially applicable for practical use are those evaluated as A or B.

(31) Film Producibility

A biaxially oriented white polypropylene film of 5 m width was made and, film breakage was checked when wound 10,000 m, and the film producibility was evaluated by the following criteria.

A: There was no film breakage and the film production was stable.

B: There was 1 or less film breakage and the film production was stable.

C: There were 2 or more film breakages, and the film production was not necessarily stable.

Films industrially applicable for practical use are those evaluated as A or B.

(32) Processability

In the above-mentioned (31), by inspecting if a white powder based on falling off of the immiscible resins or particles on a metal roll arranged in film producing machine, especially on a drawing roll, winder roll or on a metal roll in receiving paper production process, and it was evaluated by the following criteria.

Good: The roll is not deposited with the white powder.

Bad: The roll was deposited with the white powder to stain the process.

Films industrially applicable for practical use are those evaluated as good.

EXAMPLES

The present invention is explained with reference to the following examples, but the present invention is not limited thereto.

Whereas, in order to obtain a film having a predetermined thickness constitution, extruding amounts of respective extruders were controlled to predetermined values. Whereas, for any film which was capable of being industrially produced in the following description, it was confirmed to be biaxially orientated by the method of the above-mentioned (6). And, regarding the film surface characteristics, as far as not especially described, it was measured for the layer B which was drum side, but when a skin layer was not laminated, it was measured for the drum side of the layer A.

Furthermore, as the resin and additive used in each example, the following ones were used.

hPP1: Homopolypropylene "WF836DG3" (MFR: 7 g/10 min, isotactic index: 97%) produced by Sumitomo Chemical Co.

hPP2: Homopolypropylene "F107BV" (MFR: 7 g/10 min, isotactic index: 98%) produced by Prime Polymer Co., Ltd.

HMS-PP: Polypropylene "PF-814" (MFR: 3 g/10 min, isotactic index: 97%) produced by Basell: Said resin is a polypropylene having a long chain branch in its main skeleton.

mVLDPE: "Engage (trademark)" 8411 (MFR: 18 g/10 min (190° C.)) produced by Dow Chemical Co.: Low density polyethylene by metallocene catalyst method rEPC: Ethylene.propylene random copolymer "FL6412" (co-polymerization amount of ethylene=4 mass %, MFR: 6 g/10 min, isotactic index: 97%) produced by Sumitomo Chemical Co.

βPP: Polypropylene to which β crystal nucleating agent is added "BEPOL (trademark)" B022-SP (MFR: 1.8 g/10 min) produced by Sunoco Chemicals.

βMP: Polymethyl pentene "TPX (trademark)" RT-18 (MFR: 26 g10 min (260° C.)) produced by Mitsui Chemicals, Inc.

Example 1

A resin material of the core layer (layer A) and a resin material of the skin layer (layer B) were prepared as follows.
[Resin Material of Layer A]

0.15 mass parts of IRGANOX (trademark) 1010 produced by Ciba Specialty Chemicals Inc., as an antioxidant, and 0.1 mass part of IRGAFOS (trademark) 168 produced by Ciba Specialty Chemicals Inc., as a heat stabilizer, were added to a mixture of 100 mass parts consisting of 83.8 mass % of hPP1, 3 mass % of HMS-PP, 3 mass % of mVLDPE, 0.2 mass % of N,N'-dicyclohexyl-2,6-naphthalene dicarboxyamide (NU-100 produced by New Japan Chemical co., ltd.), as a β crystal nucleating agent, and 10 mass % of titanium oxide of an average particle diameter of 200 nm (TITONE, R-11P produced by Sakai Chemical Industry co., ltd.), as a particle to be finely dispersed in film in the range of average dispersed diameter of 60 to 400 nm, and fed to a twin screw extruder having counter rotation screws of L/D=50. After melt-kneaded at 300° C., it was extruded in a gut shape, cooled by passing through a water bath of 20° C., and after cutting into 5 mm length by a chip cutter, dried at 100° C. for 2 hours to obtain a chip.
[Resin Material of Layer B]

73.8 mass % of hPP1, 25 mass % of rEPC, 0.2 mass % of spherical silica particle of average particle diameter 1.7 μm (ATM-20S produced by Mizusawa Industrial Chemicals, Ltd.), and, 1 mass % of HMS-PP were mixed and fed to a twin screw extruder. After melt-kneaded at 280° C., it was extruded in a gut shape, cooled by passing through a water bath of 20° C., and after cutting into 5 mm length by a chip cutter, dried at 100° C. for 2 hours to obtain a chip.

The above-mentioned resin material of the layer A was fed to an extruder (a), melt-kneaded at 230° C., filtered by a leaf disc type filter of 35 μm cut and then, introduced to a multi-manifold type 2-kinds-2-layers composite die. Next, the above-mentioned resin material of the layer B was fed to an extruder (b), melt-kneaded at 260° C., and after filtered by a metal mesh filter of 35 μm cut, introduced to the above-mentioned die. The molten polymer of the extruder (b) was laminated to one surface of the molten polymer of the extruder (a) in the die and molded by co-extrusion into a sheet.

Thus obtained molten polymer laminate body was extruded from the die such that the layer B would contact with a metal drum, and solidified by casting on the metal drum of its surface temperature maintained at 95° C., to form into a sheet. At this time, from the side of surface of the sheet not contacting with the metal drum (hereafter, abbreviated as ND surface), by using an air-knife, the sheet was closely contacted to the drum by blowing air of 90° C. The close contact time of the sheet to the drum at this time was 30 seconds. The obtained undrawn laminate sheet was, after being preheated by introducing it into an oven heated to 130° C., drawn 5 times in longitudinal direction, and cooled to 100° C. by a cooling roll. The longitudinal drawing speed at this time was 30,000%/min.

Successively, the longitudinally drawn film was introduced to a tenter while both sides were grasped by clips, preheated at 155° C., drawn in transverse direction by a mechanical ratio of 9 times in an atmosphere heated to 145° C. The transverse drawing speed of this time was 2,500%/min. Successively, in order to complete crystal orientation of the biaxially oriented white polypropylene film to impart smoothness and dimension stability, it was heat set at 160° C. while being relaxed 5% in transverse direction in the tenter, and after gradually cooled uniformly, cooled to room temperature.

Furthermore, the layer B surface (D surface) of the white polypropylene film was treated by a corona discharge under 100% nitrogen atmosphere, and the opposite surface (ND surface) was treated by a corona discharge in the air. At this time, the treating intensity was 15 W·min/m², and surface wet tension of the D surface was 42 mN/m, and wet tension of the ND surface was 37 mN/m. And, thickness constitution of the obtained white polypropylene film was, layer A/layer B=30 μm/5 μm.

Next, by the method of [Determination method and evaluation method of characteristics] (27), a receiving layer was coated on the layer B to be processed into a receiving sheet for thermal transfer recording.

Example 2

A resin material of layer A and a resin material of layer B were prepared as follows.
[Resin Material of Layer A]

A chip prepared in the same conditions as Example 1, except changing the ratio of hPP1 to 90.8 mass % and the ratio of titanium oxide particle to 3 mass %, was used.
[Resin Material of Layer B]

A chip prepared in the same conditions as Example 1, except changing the ratio of hPP1 to 71 mass % and the adding amount of the spherical silica particle to 3 mass %, was used.

A biaxially oriented white polypropylene film was prepared in the same way as Example 1 except feeding the above-mentioned resin material to a 2-kinds-3-layers die to make into a 2-kinds-3-layers constitution of B/A/B type in which the layer B was laminated to both surfaces of the layer A. And, a receiving sheet was prepared by using the obtained white polypropylene film as a base and by forming a receiving layer on the layer B of the surface side which contacts with the metal drum (D surface) in the same conditions as Example 1. Whereas, the thickness constitution of the obtained white polypropylene film was layer B/layerA/layer B=1 µm/33 µm/1 µm.

Example 3

A resin material of the layer A and a resin material of the layer B were prepared as follows,
[Resin Material of Layer A]
A chip prepared in the same conditions as Example 1, except changing the ratio of hPP1 to 73.8 mass % and the ratio of titanium oxide particle to 20 mass %, was used.
[Resin Material of Layer B]
A chip prepared in the same conditions as Example 1, except changing the ratio of hPP1 to 73.95 mass % and the adding amount of the spherical silica particle to 0.05 mass %, was used.

A biaxially oriented white polypropylene film was prepared in the same way as Example 1 except feeding the above-mentioned resin material to a 2-kinds-3-layers die to make into a 2-kinds-3-layers constitution of B/A/B type in which the layer B was laminated to both surfaces of the layer A. And, a receiving sheet was prepared by using the obtained white polypropylene film as a base and by forming a receiving layer on the layer B of the D surface side in the same conditions as Example 1.

Whereas, the thickness constitution of the obtained white polypropylene film was layer B/layerA/layer B=1 µm/33 µm/1 µm.

Example 4

A resin material of the layer A and a resin material of the layer B were prepared as follows.
[Resin Material of Layer A]
0.15 mass parts of IRGANOX (trademark) 1010 produced by Ciba Specialty Chemicals Inc., as an antioxidant, and 0.1 mass parts of IRGAFOS (trademark) 168 produced by Ciba Specialty Chemicals Inc., as a heat stabilizer, were added to a mixture of 100 mass parts consisting of 69.95 mass % of hPP2, 5 mass % of mVLDPE, 0.05 mass % of N,N'-dicyclohexyl-2,6-naphthalene dicarboxyamide (NU-100 produced by New Japan Chemical co., ltd.) as a β crystal nucleating agent and 25 mass % of a master chip comprising 60 mass % of titanium oxide (PEONY (trademark) WHITE L-11165MPT) produced by Dainippon Ink and Chemicals Co., and by using a twin screw extruder, after melt-kneaded at 300° C., it was extruded in a gut shape, cooled by passing through a water bath of 20° C., and after cutting into 5 mm length by a chip cutter, dried at 100° C. for 2 hours to obtain a chip.
[Resin Material of Layer B]
A chip prepared in the same conditions as Example 1 by mixing 99.6 mass % of rEPC, 0.2 mass % of rosin-based α crystal nucleating agent ("Pinecrystal (trademark)" KM-1600 produced by Arakawa Chemical Industries, Ltd.), and, 0.2 mass % of the same spherical silica particle as that of Example 1, was used.

A biaxially oriented white polypropylene film was prepared in the same way as Example 1 except feeding the above-mentioned resin material to a 2-kinds-3-layers die to make into a 2-kinds-3-layers constitution of B/A/B type in which the layer B was laminated to both surfaces of the layer A, setting surface temperature of the metal drum to 85° C. and making the thickness constitution into layer B/layer A/layer B=2 µm/31 µm/2 µm. And, a receiving sheet was prepared by using the obtained white polypropylene film as a base and by forming a receiving layer on the layer B of the D surface side in the same conditions as Example 1.

Example 5

A resin material of layer A, a resin material of layer B, and a resin material of other layer (layer C) were prepared as follows.
[Resin Material of Layer A]
A chip prepared in the same conditions as Example 1, except mixing in a ratio of 45 mass % of hPP1, 45 mass % of βPP and 10 mass % of the same titanium oxide particle as Example 1, was used.
[Resin Material of Layer B]
The chip prepared in Example 1 was used.
[Resin Material of Layer C]
A chip prepared in the same conditions as the material of layer B of Example 1, except mixing in a ratio of 49.8 mass % of hPP1, 50 mass % of rEPC and 0.2 mass % of a spherical silica particle of average particle diameter 1.7 µm, was used.

The resin material of layer A was fed to the extruder (a), melt-kneaded at 210° C., filtered by a leaf disc type filter of 35 µm cut and then, introduced to a multimanifold type 3-kinds-3-layers composite die. Next, the above-mentioned resin material of the layer B was fed to an extruder (b), melt-kneaded at 260° C., and after filtered by a metal mesh filter of 35 µm cut, introduced to the above-mentioned die. And, the resin material of the above-mentioned layer C was fed to an extruder (c), melt-kneaded at 260° C., and after filtered by a metal mesh filter of 35 µm cut, introduced to the above-mentioned die.

The molten polymers of the extruder (b) and the extruder (c) were respectively laminated to both surfaces of the molten polymer of the extruder (a) in the die and molded by co-extrusion into a sheet.

Thus obtained molten polymer laminate body was extruded from the die such that the layer B would contact with a metal drum, and solidified on a metal drum of its surface temperature maintained at 110° C., to form into a sheet. At this time, the sheet was closely contacted to the drum by blowing air of 60° C. from ND surface side by using an air-knife. The close contact time of the sheet to the drum at this time was 15 seconds. The obtained undrawn laminate sheet was, after being preheated by introducing it into an oven heated to 130° C., drawn 5 times in longitudinal direction, and cooled to 100° C. by a cooling roll. The longitudinal drawing speed at this time was 100,000%/min.

Successively, the longitudinally drawn film was introduced to a tenter while both sides were grasped by clips, preheated at 165° C., drawn in transverse direction 9 times in an atmosphere heated to 145° C. The transverse drawing speed of this time was 5,000%/min. Successively, in order to complete crystal orientation of the biaxially oriented white polypropylene film to impart smoothness and dimension stability, it was heat set at 160° C. while being relaxed 5% in transverse direction in the tenter, and after gradually cooled uniformly, cooled to room temperature.

A biaxially oriented white polypropylene film was prepared in the same conditions as Example 1 except carrying out, after the biaxial drawing, a corona discharge treatment under an air atmosphere on the layer B surface (D surface side) and under the mixed gas atmosphere of 80 volume % nitrogen and 20 volume % carbon dioxide on the layer C surface (ND surface side). And, a receiving sheet was prepared by using the obtained white polypropylene film as a base, and by forming a receiving layer on the layer C of the ND surface side in the same conditions as Example 1.

Whereas, wet tension of the layer B surface of the obtained white polypropylene film was 37 mN/m and wet tension of the layer C surface was 42 mN/m. And, its thickness constitution was layer B/layer A/layer C=1 μm/31 μm/1 μm.

Example 6

A resin material of layer A, a resin material of layer B and a resin material of layer C were prepared as follows.
[Resin Material of Layer A]
0.15 mass parts of IRGANOX (trademark) 1010 produced by Ciba Specialty Chemicals Inc., as an antioxidant, and 0.1 mass parts of IRGAFOS (trademark) 168 produced by Ciba Specialty Chemicals Inc., as a heat stabilizer, were added to a mixture consisting of 89.8 mass % of hPP1, 0.2 mass % of NU-100 as a β crystal nucleating agent and 10 mass % of a titanium oxide particle used in Example 1, and after melt-kneaded at 300° C. by a twin screw extruder it was extruded in a gut shape, cooled by passing through a water bath of 20° C., and after cutting into 5 mm length by a chip cutter, dried at 100° C. for 2 hours to obtain a chip.
[Resin Material of Layer B]
A chip prepared in the same conditions as Example 1, by mixing in a ratio of 21.8 mass % of hPP1, 75 mass % of rEPC, 3 mass % of HMS-PP and 0.2 mass % of cross-linked polymethyl methacrylate particle of average particle diameter 2 μm (M1002 produced by Nippon Shokubai Co., Ltd.), was used.
[Resin Material of Layer C]
A chip prepared in the same conditions as the material of layer B of Example 1, except mixing in a ratio of 24.8 mass % of hPP1, 75 mass % of rEPC1, and 0.2 mass % of spherical silica particle of average particle diameter 2.5 μm (ATM-25 produced by Mizusawa Industrial Chemicals, Ltd.), was used.

A biaxially oriented white polypropylene film was prepared in the same conditions as Example 5 except using the above-mentioned resin material. And, a receiving sheet was prepared by using the obtained white polypropylene film as a base and by forming a receiving layer on the layer C of the ND surface side in the same conditions as Example 1.

Example 7

A resin material of layer A, a resin material of layer B, and a resin material of layer C were prepared as follows.
[Resin Material of Layer A]
A chip prepared in the same conditions as the resin material of layer A of Example 6, except changing hPP1 to 84.8 mass % and an adding amount of the titanium oxide particle to 15 mass %, was used.
[Resin Material of Layer B]
A chip prepared in the same conditions as the resin material of layer B of Example 2, except changing the particle to be added from the spherical silica particle to PMP which is an immiscible resin, was used.
[Resin Material of Layer C]
A chip prepared in the same conditions as the layer C of Example 5, except changing silica particle to be added to a spherical silica particle of an average particle diameter of 3 μm (ATM-30 produced by Mizusawa Industrial Chemicals, Ltd.), was used.

A biaxially oriented white polypropylene film was prepared in the same conditions as Example 5 except using the above-mentioned resin material. Average dispersed diameter of PMP in the layer B was 1 μm. And, its thickness constitution was layer B/layer A/layer C=3 μm/29 μm/3 μm. And, a receiving sheet was prepared by using the obtained white polypropylene film as a base, and by forming a receiving layer on the layer C of the ND surface side in the same conditions as Example 1.

Example 8

A resin material of layer A and a resin material of layer B were prepared as follows.
[Resin Material of Layer A]
A chip prepared in the same conditions as Example 1, except using a zinc oxide particle of an average particle diameter 200 nm instead of the titanium oxide particle, was used.
[Resin Material of Layer B]
The same chip as Example 1 was used.
The resins of the layer A and the layer B were fed to a 2-kinds-3-layers die of B/A/B type and a biaxially oriented white polypropylene film was prepared in the same way as Example 2. And, by using the obtained white polypropylene film as a base, a receiving sheet was prepared by forming a receiving layer on the layer B of the D surface side in the same conditions as Example 1. Whereas, the thickness constitution of the obtained white polypropylene film was layer B/layer A/layer B=1 μm/33 μm/1 μm.

Example 9

By using the resin material of layer A and the resin material of layer B of Example 4, a biaxially oriented white polypropylene film was prepared in the same conditions except, in the film production conditions of Example 1, raising the surface temperature of the metal drum to 120° C. and changing the longitudinal drawing ratio to 6 times. And, by using the obtained white polypropylene film as a base, a receiving sheet was prepared by forming a receiving layer on the layer B of the D surface side in the same conditions as Example 1. Whereas, the thickness constitution of the obtained white polypropylene film was layer B/layer A/layer B=1 μm/33 μm/1 μm.

Example 10

Resin material of layer A and resin material of layer B were prepared as follows.
[Resin Material of Layer A]
The resin of layer A used in Example 4 was used.
[Resin Material of Layer B]
A chip was prepared by mixing in a ratio of 74.8 mass % of hPP1, 25 mass % of rEPC1 and, 0.2 mass % of spherical silica particle of an average particle diameter 1.7 μm, and making other conditions same as the resin of layer B of Example 1.

By using the above-mentioned resin material, a biaxially oriented white polypropylene film was prepared in the same conditions except, in the film production conditions of Example 1, lowering the surface temperature of the metal drum to 70° C. and changing the longitudinal drawing ratio to 4 times. And, by using the obtained white polypropylene film as a base, a receiving sheet was prepared by forming a receiving layer on the layer B of the D surface side in the same conditions as Example 1. Whereas, the thickness constitution of the obtained white polypropylene film was layer B/layer A/layer $B$=1 μm/33 μm/1 μm.

Example 11

A film production and processing were carried out in the same conditions except changing, in Example 2, the metal drum temperature to 50° C.

Example 12

A film production and processing were carried out in the same conditions except changing, in Example 2, the particle to be added to the resin of layer A from the titanium oxide particle to an α-aluminium oxide particle of average particle diameter of 0.1 μm.

TABLE 1

| | | | Resin composition of core layer (layer A) | | | | | |
|---|---|---|---|---|---|---|---|---|
| | PP | Ratio (mass %) | β crystal nucleating agent/βPP | Ratio (mass %) | Other polymer other than PP | Ratio (mass %) | Particle (a) | Ratio (mass %) |
| Example 1 | hPP1 HMS-PP | 83.8 3 | NU-100 | 0.2 | mVLDPE | 3 | $TiO_2$ | 10 |
| Example 2 | hPP1 HMS-PP | 90.8 3 | NU-100 | 0.2 | mVLDPE | 3 | $TiO_2$ | 3 |
| Example 3 | hPP1 HMS-PP | 73.8 3 | NU-100 | 0.2 | mVLDPE | 3 | $TiO_2$ | 20 |
| Example 4 | hPP2 Matrix of PEONY | 69.95 10 | NU-100 | 0.05 | mVLDPE | 5 | $TiO_2$ | 15 |
| Example 5 | hPP1 | 45 | βPP | 45 | — | — | $TiO_2$ | 10 |
| Example 6 | hPP1 | 89.8 | NU-100 | 0.2 | — | — | $TiO_2$ | 10 |
| Example 7 | hPP1 | 84.8 | NU-100 | 0.2 | — | — | $TiO_2$ | 15 |
| Example 8 | hPP1 HMS-PP | 83.8 3 | NU-100 | 0.2 | mVLDPE | 3 | ZnO | 10 |
| Example 9 | hPP2 Matrix of PEONY | 69.95 10 | NU-100 | 0.05 | mVLDPE | 5 | $TiO_2$ | 15 |
| Example 10 | hPP2 Matrix of PEONY | 69.95 10 | NU-100 | 0.05 | mVLDPE | 5 | $TiO_2$ | 15 |
| Example 11 | hPP1 HMS-PP | 90.8 3 | NU-100 | 0.2 | mVLDPE | 3 | $TiO_2$ | 3 |
| Example 12 | hPP1 HMS-PP | 90.8 3 | NU-100 | 0.2 | mVLDPE | 3 | $Al_2O_3$ | 3 |

TABLE 2

| | | | Resin composition of skin layer (layer B) | | | | |
|---|---|---|---|---|---|---|---|
| | PP | Ratio (mass %) | Crystal nucleating agent or resin | Ratio (mass %) | Particle (b) | Ratio (mass %) | Tc (° C.) |
| Example 1 | hPP1 rEPC | 73.8 25 | HMS-PP | 1 | $SiO_2$ | 0.2 | 121 |
| Example 2 | hPP1 rEPC | 71 25 | HMS-PP | 1 | $SiO_2$ | 3 | 122 |
| Example 3 | hPP1 rEPC | 73.95 25 | HMS-PP | 1 | $SiO_2$ | 0.05 | 121 |
| Example 4 | rEPC | 99.6 | Pinecrystal | 0.2 | $SiO_2$ | 0.2 | 126 |
| Example 5 | hPP1 rEPC | 73.8 25 | HMS-PP | 1 | $SiO_2$ | 0.2 | 121 |
| Example 6 | hPP1 rEPC | 21.8 75 | HMS-PP | 3 | Cross-linked PMMA | 0.2 | 115 |
| Example 7 | hPP1 rEPC | 71 25 | HMS-PP | 1 | PMP | 3 | 120 |
| Example 8 | hPP1 rEPC | 73.8 25 | HMS-PP | 1 | $SiO_2$ | 0.2 | 121 |
| Example 9 | rEPC | 99.6 | Pinecrystal | 0.2 | $SiO_2$ | 0.2 | 126 |
| Example 10 | hPP1 rEPC | 74.8 25 | — | — | $SiO_2$ | 0.2 | 107 |
| Example 11 | hPP1 rEPC | 71 25 | HMS-PP | 1 | $SiO_2$ | 3 | 122 |
| Example 12 | hPP1 rEPC | 71 25 | HMS-PP | 1 | $SiO_2$ | 3 | 122 |

TABLE 3

| | Resin composition of skin layer (layer C) | | | | Film production conditions | | |
|---|---|---|---|---|---|---|---|
| | PP-based resin | Ratio (mass %) | Additive | Ratio (mass %) | Metal drum temperature (° C.) | Sticking to metal drum | Drawing ratio (longitudinal × transverse) |
| Example 1 | — | — | — | — | 95 | Good | 5 × 9 |
| Example 2 | — | — | — | — | 95 | Good | 5 × 9 |
| Example 3 | — | — | — | — | 95 | Good | 5 × 9 |
| Example 4 | — | — | — | — | 85 | Good | 5 × 9 |
| Example 5 | hPP1 rEPC | 49.8 50 | $SiO_2$ | 0.2 | 110 | Good | 5 × 9 |
| Example 6 | hPP1 rEPC | 24.8 75 | $SiO_2$ | 0.2 | 110 | Good | 5 × 9 |
| Example 7 | hPP1 rEPC | 49.8 50 | $SiO_2$ | 0.2 | 110 | Good | 5 × 9 |
| Example 8 | — | — | — | — | 95 | Good | 5 × 9 |
| Example 9 | — | — | — | — | 120 | Good | 6 × 9 |
| Example 10 | — | — | — | — | 70 | Good | 4 × 9 |
| Example 11 | — | — | — | — | 50 | Good | 5 × 9 |
| Example 12 | — | — | — | — | 50 | Good | 5 × 9 |

TABLE 4

| | Film producibility | Processability | Thickness constitution (μm) | Layer A | | Layer B | Layer C |
|---|---|---|---|---|---|---|---|
| | | | | Number of void having nucleus (voids) | Average dispersed diameter of particle (nm) | Average dispersed diameter of particle (μm) | Average dispersed diameter of particle (μm) |
| Example 1 | A | Good | A/B (30/5) | 20 | 250 | 2 | — |
| Example 2 | B | Good | B/A/B (1/33/1) | 7 | 250 | 2 | — |
| Example 3 | B | Good | B/A/B (1/33/1) | 35 | 300 | 2 | — |
| Example 4 | A | Good | B/A/B (2/31/2) | 28 | 250 | 2 | — |
| Example 5 | A | Good | B/A/C (1/33/1) | 22 | 250 | 2 | 2 |
| Example 6 | A | Good | B/A/C (1/33/1) | 21 | 250 | 2 | 2.5 |
| Example 7 | A | Good | B/A/C (3/29/3) | 27 | 250 | 1 | 3 |
| Example 8 | A | Good | B/A/B (1/33/1) | 12 | 350 | 2 | |
| Example 9 | B | Good | B/A/B (1/33/1) | 29 | 250 | 2 | |
| Example 10 | B | Good | B/A/B (1/33/1) | 28 | 250 | 2 | |
| Example 11 | B | Good | B/A/B (1/33/1) | 5 | 250 | 2 | — |
| Example 12 | B | Good | B/A/B (1/33/1) | 4 | 380 | 2 | — |

TABLE 5

| | Surface characteristics of layer B | | | | | | | |
|---|---|---|---|---|---|---|---|---|
| | Porosity (%) | Surface glossiness (%) | Ra (μm) | b value | Surface defect | Cushion factor (%) | Optical density | Kinetic friction coefficient |
| Example 1 | 0.2 | 90 | 0.27 | −4.5 | Good | 21 | 0.8 | 0.32 |
| Example 2 | 1.2 | 85 | 0.45 | −2.8 | Good | 19 | 0.7 | 0.25 |
| Example 3 | 0.05 | 103 | 0.33 | −5.2 | Good | 25 | 0.8 | 0.45 |
| Example 4 | 0.1 | 125 | 0.15 | −4.1 | Good | 22 | 0.7 | 0.37 |
| Example 5 | 0.1 | 90 | 0.27 | −4.5 | Good | 22 | 0.7 | 0.47 |
| Example 6 | 0.1 | 125 | 0.25 | −4.0 | Good | 20 | 0.7 | 0.35 |
| Example 7 | 0.1 | 90 | 0.47 | −4.7 | Good | 22 | 0.8 | 0.30 |
| Example 8 | 0.1 | 90 | 0.27 | −4.5 | Good | 18 | 0.7 | 0.32 |
| Example 9 | 0.2 | 75 | 0.25 | −5.5 | Good | 24 | 0.8 | 0.35 |
| Example 10 | 0.1 | 127 | 0.18 | −2.5 | Good | 15 | 0.6 | 0.35 |

TABLE 5-continued

| | Surface characteristics of layer B | | | | | | |
|---|---|---|---|---|---|---|---|
| | Porosity (%) | Surface glossiness (%) | Ra (μm) | b value | Surface defect | Cushion factor (%) | Optical density | Kinetic friction coefficient |
| Example 11 | 1.2 | 84 | 0.43 | −2.7 | Good | 12 | 0.5 | 0.25 |
| Example 12 | 1.2 | 84 | 0.43 | −2.7 | Good | 18 | 0.7 | 0.25 |

TABLE 6

| | | | | Receiving sheet characteristics | | | | |
|---|---|---|---|---|---|---|---|---|
| | β crystal activity | Porosity (%) | Specific gravity of film | Light reflectance (%) | Sensitivity | Crease resistance | Emboss depth (μm) | Emboss resistance | Close contactness of receiving layer |
| Example 1 | Good | 48 | 0.61 | 91 | A | A | 8 | A | B |
| Example 2 | Good | 43 | 0.57 | 90 | A | A | 15 | B | B |
| Example 3 | Good | 64 | 0.54 | 98 | A | B | 5 | A | B |
| Example 4 | Good | 60 | 0.53 | 94 | A | A | 7 | A | B |
| Example 5 | Good | 48 | 0.62 | 91 | A | A | 10 | B | A |
| Example 6 | Good | 54 | 0.55 | 90 | A | A | 8 | A | A |
| Example 7 | Good | 61 | 0.51 | 95 | A | A | 10 | B | A |
| Example 8 | Good | 42 | 0.78 | 90 | A | A | 12 | B | B |
| Example 9 | Good | 65 | 0.47 | 95 | A | B | 17 | B | B |
| Example 10 | Good | 30 | 0.94 | 85 | B | A | 4 | A | B |
| Example 11 | Good | 19 | 0.81 | 70 | B | A | 6 | A | B |
| Example 12 | Good | 39 | 0.61 | 89 | A | A | 18 | B | B |

The resin compositions, film production conditions, film characteristics and receiving sheet characteristics of the biaxially oriented white polypropylene films and the receiving sheets of Examples 1 to 10 are shown in Tables 1 to 6.

From Tables, the white polypropylene films of Examples 1 to 9 did not stick to metal drum and were excellent in film producibility and processability. And, in the film surfaces after biaxial drawing, a crater-like defect was not found. In reflection of these facts, surface roughness of the layer B was small, the kinetic friction coefficient was low and the slipperiness was good, and the glossiness was high. And, since they formed uniform and dense voids without forming coarse voids, porosity was high in a degree which does not impair crease resistance and emboss resistance, cushion factor was high, and had a good optical density and b value. A receiving sheet for thermal transfer recording, in which such a white polypropylene film was used as a base and a receiving layer was formed on the layer B, was high in adhesive strength of the receiving layer and very high in sensitivity. And, this white polypropylene film showed a very high value of light reflectance at 560 nm.

In Example 10, since the crystallization temperature of the skin layer (layer B) was low, the reflectance was low compared to the other examples, but it was a level of no problem in practical use.

In Example 11, since the porosity of the film was low, the sensitivity and light reflectance were slightly inferior, but other characteristics were excellent.

In Example 12, the emboss resistance was slightly inferior since the number of void having a nucleus was small in the core layer (layer A), but other characteristics were excellent.

Comparative Example 1

A biaxially oriented white polypropylene film of a thickness of 35 μm was prepared in the same conditions as Example 1 except it was made only of a single layer film of the core layer (layer A) without laminating the skin layer (layer B). And, by using the obtained white polypropylene film as a base, a receiving sheet was prepared in the same conditions as Example 1 by forming a receiving layer on the surface of the D surface side.

Comparative Example 2

A biaxially oriented white polypropylene film of a film thickness constitution of layer B/layer A/layer B=1 μm/33 μm/1 μm was prepared by feeding the same resin material as Example 2 to a 2-kinds-3-layers die in the same conditions as Example 2 except increasing hPP1 instead of adding the titanium oxide particle to the core layer (layer A). And, by using the obtained white polypropylene film as a base, a receiving sheet was prepared in the same conditions as Example 1 by forming a receiving layer on the surface of layer B of the D surface side.

Comparative Example 3

A biaxially oriented white polypropylene film of a film thickness constitution of layer B/layer A/layer B=1 μm/33 μm/1 μm was prepared by feeding the same resin material as Example 2 to a 2-kinds-3-layers die in the same conditions as Example 2 except increasing the amount of the titanium oxide particle added in the core layer (layer A) to 25 mass %, and decreasing the ratio of hPP1 used in the same amount. And, by using the obtained white polypropylene film as a base, a receiving sheet was prepared in the same conditions as Example 1 by forming a receiving layer on the surface of layer B of the D surface side.

Comparative Example 4

A biaxially oriented white polypropylene film was prepared in the same conditions as Example 1, by feeding the same resin material, except changing the titanium oxide particle of the core layer (layer A) in Example 1 to a calcium carbonate particle of an average particle diameter of 1 μm (MSK-PO produced by Maruo Calcium Co., Ltd.), and except changing to feed to a 2-kinds-3-layers die to make a 2-kinds-3-layers constitution of B/A/B type in which the layer B is laminated to both surfaces of the layer A. And, by using the obtained white polypropylene film as a base, a receiving sheet was prepared in the same conditions as Example 1 by forming a receiving layer on the surface of layer B of the D surface side.

Comparative Example 5

A biaxially oriented white polypropylene film was prepared in the same conditions as Comparative example 4 except changing the titanium oxide particle of the core layer (layer A) of Comparative example 4 to a zinc oxide particle of a primary average particle diameter of 10 nm (FONEX-75 produced by Sakai Chemical Industry co., ltd.). And, by using the obtained white polypropylene film as a base, a receiving sheet was prepared in the same conditions as Example 1 by forming a receiving layer on the surface of layer B of the D surface side.

Comparative Example 6

A biaxially oriented white polypropylene film was prepared in the same conditions as Comparative example 4 except changing the titanium oxide particle of the core layer (layer A) of Comparative example 4 to a polycarbonate (A-2500 produced by Idemitsu Petro Chemical Co., Ltd.) which is immiscible with polypropylene resin. And, by using the obtained white polypropylene film as a base, a receiving sheet was prepared in the same conditions as Example 1 by forming a receiving layer on the surface of layer B of the D surface side.

Comparative Example 7

A biaxially oriented white polypropylene film was prepared in the same conditions as Example 1 except replacing the β crystal nucleating agent, in the core layer (layer A) resin composition in Example 1, to hPP1. And, by using the obtained white polypropylene film as a base, a receiving sheet was prepared in the same conditions as Example 1 by forming a receiving layer on the surface of layer B of the D surface side.

Comparative Example 8

A biaxially oriented white polypropylene film was prepared in the same conditions as Example 1 except changing the spherical silica particle of the skin layer (layer B) of Example 1 to a calcium carbonate particle of an average particle diameter of 0.6 μm (CUBE produced by Maruo Calcium Co., Ltd.). And, by using the obtained white polypropylene film as a base, a receiving sheet was prepared in the same conditions as Example 1 by forming a receiving layer on the surface of layer B of the D surface side.

Comparative Example 9

A biaxially oriented white polypropylene film was prepared in the same conditions as Example 1 except changing the spherical silica particle of the skin layer (layer B) of Example 1 to a calcium carbonate particle of an average particle diameter of 5.6 μm (CUBE produced by Maruo Calcium Co., Ltd.). And, by using the obtained white polypropylene film as a base, a receiving sheet was prepared in the same conditions as Example 1 by forming a receiving layer on the surface of layer B of the D surface side.

Comparative Example 10

A biaxially oriented white polypropylene film was prepared in the same conditions as Example 1 except decreasing the amount of spherical silica particle added to the skin layer (layer B) of Example 1 to 0.02 mass % and increasing hPP1 in the decreased amount. And, by using the obtained white polypropylene film as a base, a receiving sheet was prepared in the same conditions as Example 1 by forming a receiving layer on the surface of layer B of the D surface side.

Comparative Example 11

A biaxially oriented white polypropylene film was prepared in the same conditions as Example 1 except increasing the amount of spherical silica particle added to the skin layer (layer B) of Example 1 to 6 mass % and decreasing hPP1 in the increased amount. And, by using the obtained white polypropylene film as a base, a receiving sheet was prepared in the same conditions as Example 1 by forming a receiving layer on the surface of layer B of the D surface side.

Comparative Example 12

As a resin material of layer A, the resin used in Example 1 was used. As a resin material of layer B, mixture of 99.98 mass % of rEPC and 0.02 mass % of the spherical silica particle used in Example 1 was used. A biaxially oriented white polypropylene film was prepared in the same conditions as Example 1. And, by using the obtained white polypropylene film as a base, a receiving sheet was prepared in the same conditions as Example 1 by forming a receiving layer on the surface of layer B of the D surface side.

TABLE 7

| | | | Resin composition of core layer (layer A) | | | | | | |
|---|---|---|---|---|---|---|---|---|---|
| | PP | Ratio (mass %) | β crystal nucleating agent/ βPP | Ratio (mass %) | Other polymer other than PP | Ratio (mass %) | Particle (a) | Ratio (mass %) |
| Comparative example 1 | hPP1 HMS-PP | 83.8 3 | NU-100 | 0.2 | mVLDPE | 3 | TiO$_2$ | 10 |

TABLE 7-continued

| | Resin composition of core layer (layer A) | | | | | | | |
|---|---|---|---|---|---|---|---|---|
| | PP | Ratio (mass %) | β crystal nucleating agent/ βPP | Ratio (mass %) | Other polymer other than PP | Ratio (mass %) | Particle (a) | Ratio (mass %) |
| Comparative example 2 | hPP1 HMS-PP | 93.8 3 | NU-100 | 0.2 | mVLDPE | 3 | — | — |
| Comparative example 3 | hPP1 HMS-PP | 68.8 3 | NU-100 | 0.2 | mVLDPE | 3 | TiO$_2$ | 25 |
| Comparative example 4 | hPP1 HMS-PP | 83.8 3 | NU-100 | 0.2 | mVLDPE | 3 | CaCO$_3$ | 10 |
| Comparative example 5 | hPP1 HMS-PP | 83.8 3 | NU-100 | 0.2 | mVLDPE | 3 | ZnO | 10 |
| Comparative example 6 | hPP1 HMS-PP | 83.8 3 | NU-100 | 0.2 | mVLDPE | 3 | PC | 10 |
| Comparative example 7 | hPP1 HMS-PP | 84 3 | | | mVLDPE | 3 | TiO$_2$ | 10 |
| Comparative example 8 | hPP1 HMS-PP | 83.8 3 | NU-100 | 0.2 | mVLDPE | 3 | TiO$_2$ | 10 |
| Comparative example 9 | hPP1 HMS-PP | 83.8 3 | NU-100 | 0.2 | mVLDPE | 3 | TiO$_2$ | 10 |
| Comparative example 10 | hPP1 HMS-PP | 83.8 3 | NU-100 | 0.2 | mVLDPE | 3 | TiO$_2$ | 10 |
| Comparative example 11 | hPP1 HMS-PP | 83.8 3 | NU-100 | 0.2 | mVLDPE | 3 | TiO$_2$ | 10 |
| Comparative example 12 | hPP1 HMS-PP | 83.8 3 | NU-100 | 0.2 | mVLDPE | 3 | TiO$_2$ | 10 |

TABLE 8

| | Resin composition of skin layer (layer B) | | | | | | |
|---|---|---|---|---|---|---|---|
| | PP | Ratio (mass %) | Crystal nucleating agent or resin | Ratio (mass %) | Particle (b) | Ratio (mass %) | Tc (° C.) |
| Comparative example 1 | — | — | — | — | — | — | — |
| Comparative example 2 | hPP1 rEPC | 71 25 | HMS-PP | 1 | SiO$_2$ | 3 | 122 |
| Comparative example 3 | hPP1 rEPC | 71 25 | HMS-PP | 1 | SiO$_2$ | 3 | 122 |
| Comparative example 4 | hPP1 rEPC | 73.8 25 | HMS-PP | 1 | SiO$_2$ | 0.2 | 121 |
| Comparative example 5 | hPP1 rEPC | 73.8 25 | HMS-PP | 1 | SiO$_2$ | 0.2 | 121 |
| Comparative example 6 | hPP1 rEPC | 73.8 25 | HMS-PP | 1 | SiO$_2$ | 0.2 | 121 |
| Comparative example 7 | hPP1 rEPC | 73.8 25 | HMS-PP | 1 | SiO$_2$ | 0.2 | 121 |
| Comparative example 8 | hPP1 rEPC | 73.8 25 | HMS-PP | 1 | CaCO$_3$ | 0.2 | 121 |
| Comparative example 9 | hPP1 rEPC | 73.8 25 | HMS-PP | 1 | CaCO$_3$ | 0.2 | 121 |
| Comparative example 10 | hPP1 rEPC | 73.98 25 | HMS-PP | 1 | SiO$_2$ | 0.02 | 121 |
| Comparative example 11 | hPP1 rEPC | 68 25 | HMS-PP | 1 | SiO$_2$ | 6 | 122 |
| Comparative example 12 | rEPC | 99.98 | — | — | SiO$_2$ | 0.02 | 102 |

TABLE 9

| | Film production conditions | | | | | Layer A | | Layer B |
|---|---|---|---|---|---|---|---|---|
| | Metal drum temperature (° C.) | Sticking to metal drum | Drawing ratio (longitudinal × transverse) | Film producibility | Processability | Thickness constitution (μm) | Number of voids having nucleus (voids) | Average dispersed diameter of particle (nm) | Average dispersed diameter of particle (μm) |
| Comparative example 1 | 95 | Good | 5 × 9 | C | Bad | A (35) | 21 | 250 | — |
| Comparative example 2 | 95 | Good | 5 × 9 | C | Bad | B/A/B (1/33/1) | 0 | — | — |
| Comparative example 3 | 95 | Good | 5 × 9 | C | Bad | B/A/B (1/33/1) | 43 | 300 | 2 |

TABLE 9-continued

| | Film production conditions | | | | | | Layer A | | Layer B Average |
|---|---|---|---|---|---|---|---|---|---|
| | Metal drum temperature (° C.) | Sticking to metal drum | Drawing ratio (longitudinal × transverse) | Film producibility | Processability | Thickness constitution (μm) | Number of voids having nucleus (voids) | Average dispersed diameter of particle (nm) | dispersed diameter of particle (μm) |
| Comparative example 4 | 95 | Good | 5 × 9 | C | Bad | B/A/B (1/33/1) | 5 | 2500 | 2 |
| Comparative example 5 | 95 | Good | 5 × 9 | C | Bad | B/A/C (1/33/1) | 8 | 600 | 2 |
| Comparative example 6 | 95 | Good | 5 × 9 | C | Good | B/A/B (1/33/1) | 7 | 1600 | 2 |
| Comparative example 7 | 95 | Good | 5 × 9 | C | Good | A/B (30/5) | 3 | 250 | 2 |
| Comparative example 8 | 95 | Good | 5 × 9 | C | Good | A/B (30/5) | 19 | 250 | 0.5 |
| Comparative example 9 | 95 | Good | 5 × 9 | C | Bad | A/B (30/5) | 20 | 250 | 5.3 |
| Comparative example 10 | 95 | Good | 5 × 9 | C | Good | A/B (30/5) | 18 | 250 | 2 |
| Comparative example 11 | 95 | Good | 5 × 9 | C | Bad | A/B (30/5) | 19 | 250 | 2 |
| Comparative example 12 | 95 | Bad | 5 × 9 | C | Bad | A/B (30/5) | 20 | 250 | 2 |

TABLE 10

| | Surface characteristics of layer B | | | | | | | |
|---|---|---|---|---|---|---|---|---|
| | Porosity (%) | Surface glossiness (%) | Ra (μm) | b value | Surface defect | Cushion factor (%) | Optical density | Kinetic friction coefficient |
| Comparative example 1 | — | 25 | 0.46 | −0.1 | Good | 22 | 0.7 | 0.85 |
| Comparative example 2 | 0.1 | 90 | 0.25 | −2.3 | Good | 15 | 0.6 | 0.32 |
| Comparative example 3 | 0.1 | 90 | 0.27 | −4.5 | Good | 24 | 0.8 | 0.32 |
| Comparative example 4 | 0.1 | 85 | 0.35 | −2.5 | Good | 10 | 0.6 | 0.28 |
| Comparative example 5 | 0.1 | 87 | 0.3 | −3.3 | Good | 12 | 0.7 | 0.32 |
| Comparative example 6 | 0.1 | 82 | 0.32 | −2.7 | Good | 15 | 0.6 | 0.30 |
| Comparative example 7 | 0.1 | 90 | 0.27 | −4.5 | Good | 2 | 0.3 | 0.30 |
| Comparative example 8 | 0 | 135 | 0.05 | −0.2 | Good | 22 | 0.7 | 0.65 |
| Comparative example 9 | 0.3 | 65 | 2.5 | −4.9 | Good | 21 | 0.8 | 0.18 |
| Comparative example 10 | 0 | 125 | 0.2 | −3.8 | Good | 21 | 0.7 | 0.55 |
| Comparative example 11 | 1 | 55 | 0.35 | −5.1 | Bad | 22 | 0.7 | 0.23 |
| Comparative example 12 | 0 | 35 | 0.03 | −0.1 | Bad | 22 | 0.7 | 1.20 |

TABLE 11

| | | | | | receiving sheet characteristics | | | | |
|---|---|---|---|---|---|---|---|---|---|
| | β crystal activity | porosity (%) | Specific gravity of film | Light reflectance (%) | Sensitivity | Crease resistance | Emboss depth (μm) | Emboss resistance | Close contactness of receiving layer |
| Comparative example 1 | Good | 50 | 0.61 | 87 | B | A | 23 | C | D |
| Comparative example 2 | Good | 28 | 0.66 | 83 | B | A | 24 | C | B |
| Comparative example 3 | Good | 65 | 0.57 | 92 | B | C | 21 | C | B |

TABLE 11-continued

|  | β crystal activity | porosity (%) | Specific gravity of film | Light reflectance (%) | receiving sheet characteristics | | | | |
|---|---|---|---|---|---|---|---|---|---|
|  |  |  |  |  | Sensitivity | Crease resistance | Emboss depth (μm) | Emboss resistance | Close contactness of receiving layer |
| Comparative example 4 | Good | 35 | 0.70 | 75 | C | D | 22 | C | B |
| Comparative example 5 | Good | 43 | 0.77 | 80 | C | C | 20 | C | B |
| Comparative example 6 | Good | 18 | 0.77 | 75 | C | C | 10 | B | B |
| Comparative example 7 | Bad | 13 | 1.02 | 55 | D | A | 5 | A | B |
| Comparative example 8 | Good | 48 | 0.61 | 82 | C | A | 8 | A | D |
| Comparative example 9 | Good | 49 | 0.60 | 85 | A | C | 9 | A | D |
| Comparative example 10 | Good | 48 | 0.61 | 91 | A | A | 8 | A | B |
| Comparative example 11 | Good | 50 | 0.59 | 93 | B | B | 10 | B | D |
| Comparative example 12 | Good | 47 | 0.62 | 83 | C | A | 8 | A | B |

The results are shown in Tables 7 to 11.

Figure 4:
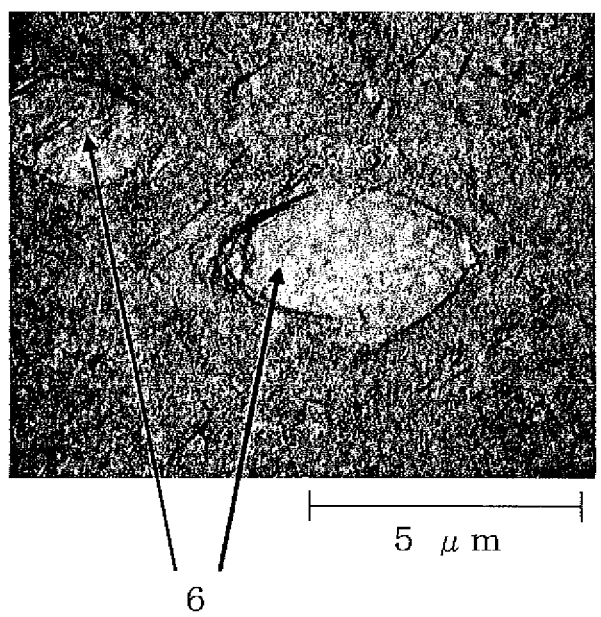
[FIG. 4] A photograph of a crater-like defect observed, formed on film surface of the white polypropylene film of Comparative example 12.

The films obtained in Comparative examples 1 to 10 did not stick to metal drum. And, in the film surface after the biaxial drawing, a crater-like defect was not found. On the other hand, in Comparative examples 11 and 12, a sticking defect on metal drum surface was found and the films were low in glossiness. In particular, in Comparative example 12, a noticeable trace of sticking with metal drum on the drawn sheet surface was found as shown in FIG. 4.

In Comparative example 1, since a skin layer (layer B) was not laminated, stability of film production and processability were not good and the obtained film was low in glossiness. And, since there were through holes, when a receiving layer was coated, the coating agent penetrated inside the film and the receiving sheet was also poor in glossiness. Furthermore, maybe since a large amount of voids were present in surface layer of the film, the adhesive strength of the receiving layer was low.

In Comparative example 2, since a particle, of which average dispersed diameter was in the range of 60 to 400 nm, was not added to the core layer (layer A), film breakage frequently occurred and a stable film production was impossible. In addition, porosity of the film decreased, and when it is used as a receiving sheet, the emboss depth after printing exceeded 20 μm and the printed paper appeared to have a streak.

In Comparative example 3, since the amount contained of the particle, of which average dispersed diameter is in the range of 60 to 400 nm, exceeded 20 mass % in the core layer (layer A), a stable melt-extrusion was impossible and co-extrudability with the skin layer deteriorated to cause a surface roughness, and furthermore, when the film edges were cut to wind the film in film formation process, the particle fell off from the film edges to stain rolls in winder, etc., a long time continuous film production was impossible. Furthermore, a coarse void due to an aggregation of the particle was formed in the film and when used as a receiving sheet, the emboss depth after printing exceeded 20 μm, and the printed paper appeared to have a streak.

In Comparative example 4, since the particles in layer A aggregated and the average dispersed diameter exceeded the range of 60 to 400 nm, the particle fell off in the film formation process and a long time continuous film production became impossible to lower stability of film producibility. And, a coarse void due to an aggregation of the particle was formed in the film and when used as a receiving sheet, the emboss depth after printing exceeded 20 μm, and the printed paper appeared to have a streak.

In Comparative example 5, since dispersibility in polypropylene resin of the zinc oxide used for the layer A was not good, average dispersed diameter in the film exceeded the range of 60 to 400 nm, the particle fell off in the film formation process and a long time continuous stable film producibility and processability became difficult. A coarse void due to an aggregation of the particle was formed in the film and, accordingly, when used as a receiving sheet, sensitivity was low, the emboss depth after printing exceeded 20 μm, and the printed paper appeared to have a streak. And it was low also in optical reflectance.

In Comparative example 6, since the average dispersed diameter of the polycarbonate in the layer A exceeded the rang of 60 to 400 nm, a coarse void was formed in the film, and accordingly, when used as a receiving sheet, sensitivity was low, and reflectance was also low.

In Comparative example 7, since the film had not β-crystal activity, the void formation in layer A was very weak and the porosity was low. Accordingly, at the transverse drawing, a film breakage frequently occurred to be low in film producibility, and when used as a receiving sheet, the sensitivity was low and, furthermore, the reflectance was also low.

In Comparative example 8, since the average dispersed diameter of particle in layer B was less than 1 μm, the kinetic friction coefficient was high and the slipperiness was not good, and in the film formation process, a breakage occurred since slipperiness with metal roll was not good, and the film was inferior in productivity.

In Comparative example 9, since the average dispersed diameter of particle in layer B exceeded 4 μm, the particle fell off due to the abrasion by metal roll in the film formation process, and the surface was abraded to generate a surface defect, and a breakage occurred to make the film producibility or the processability low.

In Comparative example 10, since the amount of particle contained in layer B was less than 0.05 mass %, the kinetic friction coefficient was high, and since the slipperiness with metal roll in film formation process was not good, a breakage was occurred and the productivity was inferior.

In Comparative example 11, since the amount of particle added to the layer B exceeded 5 mass %, the particle fell off in the film formation process to stain the machine to cause a defect in the film surface, and since a film breakage occurred, the film producibility and the processability were inferior.

In Comparative example 12, since, in addition to that the amount of particle added to the skin layer was small, the crystallization temperature was low, the film adhered to hot rolls and the slipperiness was not good to cause a frequent breakages, i.e., the film producibility was inferior. Furthermore, a defect was found in the receiving sheet, and the sensitivity was low.

Industrial Applicability

The biaxially oriented white polypropylene film of the present invention has excellent film characteristics and productivity, and for example, the following applications are possible.
(1) When used as a base of receiving sheet for thermal transfer recording, the sensitivity and the productivity are compatible in a high level.
(2) Since it is excellent in shieldability and productivity, it can be used as a base of labels or general posters.
(3) Since it is excellent in shieldability and productivity, it can be used as a general packaging film.
(4) Since the cushion factor is high, the productivity is excellent and the crystallization speed is high even when melted, it can be easily recovered without staining the process, and it can be used as a buffer release film in a production process of circuit board represented by flexible print wiring board.
(5) Since it is excellent in shieldability and productivity and excellent in light reflectance characteristics, it can be used as a reflection plate of a light source.

In every case, the film of the present invention can be used singly or by being laminated with other layer. By being laminated with the other layer, it is possible to impart glossiness, heat sealability, adhesion, heat resistance, releasability, etc.

As stated above, the biaxially oriented white polypropylene film of the present invention can be widely used, as well as for thermal transfer recording, for packaging applications, industrial applications, etc.

The invention claimed is:

1. A biaxially oriented white polypropylene film containing a core layer (layer A) and a skin layer (layer B), wherein said layer B is laminated at least on one surface of said layer A, said layer A contains a polypropylene resin having β-crystal activity and 1 to 20 mass % particle (a) having an average dispersed diameter of 60 to 400 nm, and wherein, said layer B contains a polypropylene resin and 0.05 to 5 mass % particle (b) having an average dispersed diameter of 1 to 4 μm, wherein a light reflectance of said film at a wavelength of 560 nm is 90% or more.

2. The biaxially oriented white polypropylene film according to claim 1, wherein the particle (a) is at least one kind of particles selected from the group consisting of zinc oxide, aluminium oxide and titanium oxide.

3. The biaxially oriented white polypropylene film according to claim 1, wherein a porosity of the film is 20% or more.

4. The biaxially oriented white polypropylene film according to claim 1, wherein a number of voids, of which nucleus is the particle (a), present in 10 μm×10 μm cross-section of the layer A is 5 voids or more.

5. The biaxially oriented white polypropylene film according to claim 1, wherein a crystallization temperature of the layer B is 115° C. or higher.

6. The biaxially oriented white polypropylene film according to claim 1, wherein it is for a light reflection plate.

7. A light reflection plate comprising the biaxially oriented white polyproylene film described in claim 1.

8. The biaxially oriented white polypropylene film according to claim 1, wherein it is for a receiving sheet for thermal transfer recording.

9. A receiving sheet for thermal transfer recording, wherein a receiving layer is provided on at least one surface of the biaxially oriented white polypropylene film described in claim 1.

10. The receiving sheet for thermal transfer recording according to claim 9, wherein an emboss depth after printing of the receiving sheet for thermal transfer recording by a printer for thermal transfer recording is 20 μm or less.

* * * * *